(12) United States Patent
Kumar et al.

(10) Patent No.: US 7,039,923 B2
(45) Date of Patent: May 2, 2006

(54) CLASS DEPENDENCY GRAPH-BASED CLASS LOADING AND RELOADING

(75) Inventors: Ajay Kumar, Bangalore (IN);
Hanumantha Rao Susarla, Bangalore (IN)

(73) Assignee: Sun Microsystems, Inc., Santa Clara, CA (US)

( * ) Notice: Subject to any disclaimer, the term of this patent is extended or adjusted under 35 U.S.C. 154(b) by 730 days.

(21) Appl. No.: 10/125,949

(22) Filed: Apr. 19, 2002

(65) Prior Publication Data

US 2003/0200350 A1    Oct. 23, 2003

(51) Int. Cl.
*G06F 9/44* (2006.01)

(52) U.S. Cl. .................. 719/331; 719/332; 717/166

(58) Field of Classification Search ........ 719/331–332; 717/166

See application file for complete search history.

(56) References Cited

U.S. PATENT DOCUMENTS

| | | | |
|---|---|---|---|
| 6,339,841 B1 * | 1/2002 | Merrick et al. ............. | 717/166 |
| 6,470,494 B1 * | 10/2002 | Chan et al. .................. | 717/166 |
| 6,571,388 B1 * | 5/2003 | Venkatraman et al. ...... | 717/166 |
| 6,748,396 B1 * | 6/2004 | Klicnik et al. .......... | 707/103 Y |
| 6,915,511 B1 | 7/2005 | Susarla et al. | |
| 2004/0015936 A1 * | 1/2004 | Susarla et al. .............. | 717/166 |

OTHER PUBLICATIONS

Liang et al., "Dynamic Class Loading in the Jave Virtual Machine," 1998, pp. 36-44.*

Nuutila et al., "On Finding the Strong Components in a Directed Graph," 1993, pp. 1-17.*

Nuutila et al., "On Finding the Strongly Connected Components in a Directed Graph," 1993, pp. 1-14.*

"Transitive Closure and Reduction," 1997, pp. 1-3.*

"Class java.lang.ClassLoad," Sun Microsystems, Inc., *Submit a bug or feature*—Version 1.1.8 of Java Platform API Specification, 1995-1999, 6 pages.

"iPlanet Application Server Overview Guide", Chapters 2 & 4, Sun Microsystems, Inc., 2000, 14 pages.

(Continued)

*Primary Examiner*—William Thomson
*Assistant Examiner*—Qing-Yuan Wu
(74) *Attorney, Agent, or Firm*—Robert C. Kowert; Meyertons, Hood, Kivlin, Kowert & Goetzel, P.C.

(57) ABSTRACT

Embodiments of a system and method for providing class dependency graph-based class loading and reloading may be used to segregate namespaces in a graph-centric way, and may provide a set of normalized topologies that may be used to efficiently support hot-swapping of programmatic logic such as classes, applets, and beans, among other applications. Embodiments may provide a domain-independent, flexible and robust namespace segregation technique that is based on the dependency between the various classes and not on details like the roles the classes play. The problem of segregating namespaces is formulated as a graph theory problem, and a solution is sought through graph techniques. The graph may be normalized by identifying and grouping interdependent classes and non-interdependent classes in separate groups. A directed dependency relationship of the groups may be determined using the relationships between the member classes of the groups.

103 Claims, 15 Drawing Sheets

OTHER PUBLICATIONS

"Programmer's Guide (Java), iPlanet Application Server," Release 6.0, Apr. 2000, pp. 289-291.

"JAVA Language Reference," O'Reilly, 2$^{nd}$ Edition, Jul. 1997, 11 pages.

Gong, "Secure Java Class Loading," IEEE, Dec. 1998, (pp. 56-61).

"Java Dynamic Class Loader," vol. 39, No. 11, IBM Technical Disclosure Bulletin, Nov. 1996, (pp. 107-108).

Kosaraju, et al., "Detecting Cycles in Dynamic Graphs in Polynomial Time (Preliminary Version)", Dept. of Computer Science, Johns Hopkins Univ., Baltimore, MD 21218, ACM 1998, pp. 398-406.

Akio, et al., "An Effective Parallel Algorithm for Finding Strongly Connected Components of a Sparse Directed Graph," Information Processing Society of Japan, Jun. 19, 2001, 1 page.

* cited by examiner

CLASS DEPENDENCY GRAPH-BASED CLASS LOADING AND RELOADING

BACKGROUND OF THE INVENTION

1. Field of the Invention

This invention relates to computer software, and more particularly to a system and method for providing class dependency graph-based class loading and reloading in applications.

2. Description of the Related Art

Today's long-running programs have given rise to a complex set of demands. One such demand is the need for the hot deployment and redeployment of programmatic logic. This need is particularly prevalent in application server environments, where a server process may continue running uninterrupted for months or more. It is often necessary to make changes in the presentation logic and/or the business logic of applications. In the world of application servers that run large and often mission-critical applications, taking the server offline to get these changes reflected may not be possible. In the development environment, it is quite common for a developer to deploy an application or Enterprise JavaBeans™ (EJB™) bean, test it, and make certain changes to get desired results. Since deploying a business component like an EJB™ or assembling an application in itself is quite complex, in the development environment, whenever the developer changes a bean, the server has to be restarted to check the changes.

In application servers based on the J2EE™ (Java™ 2 Platform, Enterprise Edition) distributed computing model, the business presentation is typically represented using servlets and/or JavaServer Pages™ (JSP™), and the business logic typically runs in the form of distributed components such as EJBs. These application servers may, to an extent, provide for the reloading of servlets and JSPs at runtime through a custom class loader mechanism. The Java™ programming language provides class loaders for such needs. Implementations may use the Java™ class loading framework for loading and reloading of classes.

A Java™ class loader is a namespace that may include business (or other application) logic, in the form of class bytes, associated with the names. The design of the Java™ Virtual Machine (JVM) imposes a restriction that a class loader cannot be asked to change its elements. New elements (e.g. the class bytes for the class names) may, however, be added to the namespace. However, a class loader may be replaced. For example, if a class associated with a class loader is changed, the old class loader, configured to load the original class, is replaced with a new class loader configured to load the changed class.

Classes may have dependencies between each other. If a class c1 accesses some functionality in a class c2, then c2 should be accessible in the same namespace as c1, or alternatively in a namespace accessible by the class loader. The class loaders associated with these other namespaces are conventionally referred to as "parent class loaders." These class loaders may be arranged in some topology. For example, a parent-child tree topology may be used, for example based on the Java™ Development Kit (JDK™), version 1.2 class loading delegation model.

A possible architecture for a class reloading mechanism is to have a separate class loader for each application, and to have the system class loader as the parent of the class loaders. The system class loader loads the standard classes and the application server's core classes, and the application class loader loads the user-defined classes. This architecture is illustrated in FIG. 1. Since there is a single class loader that handles all the classes in an application, all the loaded classes will be reloaded for a single class change. This is added overhead for the application server.

Class Loaders

The following section provides background information on class loaders, class loading, and class reloading. This information refers to the Java™ programming language and to the Java™ Virtual Machine (JVM) architecture as an example of an implementation of class loaders, loading, and reloading. This information, however, may be relevant to other architectures, programming languages, environments including virtual machine environments, platforms, applications, application servers and/or implementations of class loaders.

The default class loading mechanism in the JVM is to load the class file from a specified location into the memory and to execute the byte code as and when the request comes in for a particular class. The default class loader, which may be referred to as a system class loader, caches the class once it loads the class. Therefore, if the class file changes after loading the class, the changes are not reflected in the program unless JVM is restarted.

Class loaders are one of the cornerstones of virtual machine architectures such as the JVM architecture. Class loaders may enable a virtual machine to load classes without knowing anything about the underlying file system semantics, and may allow applications to dynamically load classes such as Java™ classes as extension modules. For example, JVM has an embedded class loader called the primordial/system class loader. Virtual machines such as JVM may also provide a facility by which a user can introduce a custom class loader. For example, in JVM, a hook is provided to the loading mechanism through the custom class loaders. A custom class loader may load a class before or after the primordial class loader attempts to load the class. Therefore, certain policies pertaining to loading classes, maintenance, fetching classes, etc. may be implemented by the custom class loader. The custom class loader may also, for example, specify the remote location from which the classes are loaded, and/or assign appropriate security. Programmatically speaking, class loaders are ordinary objects that may be defined in code (e.g. Java™ code). In Java™, class loaders are instances of subclasses of abstract class Classloader.

In Java™, classes and interfaces are dynamically loaded, linked, and initialized. Loading is the process of finding the binary form of a class or interface type with a particular name and constructing, from that binary form, a Class object to represent the class or interface. For example, a class or Interface C's loading is triggered by another class or interface D, which references C through its runtime constant pool. Class or interface loading may also be triggered by D invoking methods in certain Java™ class libraries such as Reflection. Once a class is loaded, it is linked and resolved. Linking involves verifying and preparing a class, its direct superinterfaces, its direct superclass and its element type (if its an array type). Resolving is the process of dynamically determining concrete values from symbolic references in the runtime constant pool is known as resolving.

A class object loaded by loader L1 has a runtime signature <C1,L1> inside JVM. The same class C1, when loaded by L2, has the runtime signature <C1,L2> and thus can be distinguished from <C1,L1> by its runtime signature.

Once a class loader loads a class, the same class loader cannot load a different version of the class, as JVM internally tightly couples the class with the class loader. To maintain type safety, the virtual machine must be able to consistently obtain the same class type for a given class name and loader. The virtual machine cannot trust any user-defined loadClass method to consistently return the same type for a given name. JVM has to ensure security and behavioral consistency. Therefore, the virtual machine internally maintains a loaded class cache. The loaded class cache maps class names and the initiating loaders.

The next time the loader tries to load the class, an already cached copy of the class will be returned, but reloading will not be performed. So to reload a class requires the class to be loaded by a new loader. A runtime class type is determined not by its name alone but by its class name and its defining class loader. Therefore, two instances of the runtime class C1 loaded by different loaders L1 and L2 are different and, as mentioned above, distinguishable by their signatures.

Delegation Mechanism

The Java™ Development Kit (JDK™), version 1.2, introduces a delegation model to maintain consistency of loaded classes. Using JDK™ 1.2, class loaders may be linked in a parent-child relationship. In a class loader, a defineClass method may be provided to define the class for the JVM. A loadClass method may be called as a result of the class resolution operation, or alternatively by explicit request of the application. A class is associated with the loader that defines it. In the delegation model, the parent class loader, if one exists, may be given the opportunity to load the class before the class loader attempts to load the class itself. This parent class loader may in turn have a parent class loader, which may be given the opportunity to load the class before the class or its immediate parent class loader attempts to load the class. This delegation may continue, for example, until a class loader is reached with no parent class loader.

J2EE™

The Java™ 2 Platform, Enterprise Edition (J2EE™) defines the standard for developing multi-tier enterprise Applications. J2EE™ simplifies enterprise applications by basing them on standardized, modular components, by providing a complete set of services to those components, and by handling many details of application behavior automatically, without complex programming. J2EE™ takes advantage of many features of the Java™ 2 Platform, Standard Edition, such as "Write Once, Run Anywhere™" portability, JDBC™ (Java™ DataBase Connectivity) API for database access, Object Management Group's Common Object Request Broker Architecture (CORBA) technology for interaction with existing enterprise resources, and a security model that protects data even in internet applications. Building on this base, J2EE™ adds full support for EJB™ components, Java™ Servlets API, and JSP™ among many other technologies.

Application Servers

An application server is a server program in a computer in a distributed network that provides a framework to host business logic for an application program. The application server is frequently viewed as part of a three-tier application, consisting of a graphical user interface (GUI) server, an application (business logic) server, and a database server. More descriptively, it can be viewed as dividing an application into:

A first-tier, front-end, Web browser-based graphical user interface, usually at a personal computer or workstation.

A middle-tier business logic application or set of applications, possibly on a local area network or intranet server.

A third-tier, back-end, database and transaction server, sometimes on a mainframe or large server.

Older, legacy application databases and transaction management applications are part of the back end or third tier. The application server is the middleman between browser-based front-ends and back-end databases and legacy systems.

iPlanet™ Application Server (iAS™)

The iPlanet™ Application Server (iAS™), offered by iPlanet™ E-Commerce Solutions, provides a robust J2EE™ e-commerce platform for the development, deployment, and management of application services to a broad range of servers, clients, and devices. iAS™ maximizes application re-use and developer collaboration and demonstrates the potential of leveraging Java™ for large-scale web and wireless applications.

SUMMARY OF THE INVENTION

A system and method for providing class dependency graph-based class loading and reloading is described. Embodiments of the method and system described herein may be used to segregate namespaces in a graph-centric way, and provides a set of normalized topologies that may be used to efficiently support hot-swapping of programmatic logic such as classes, applets, and beans, among other applications. Embodiments may provide a domain-independent, flexible and robust namespace segregation technique that is independent of platform-specific roles (e.g. servlet, bean, helper, etc.). These embodiments are based on the dependency between the various classes and not on details like the roles the classes play. The problem of segregating namespaces is formulated as a graph theory problem, and a solution is sought through graph techniques. In some embodiments, the graph may be normalized by identifying and grouping interdependent classes, keeping non-interdependent classes in separate groups of at least one non-interdependent class. A directed dependency relationship of the groups is determined using the relationships between the member classes of the groups. This method may be applied to any set of dependent logical units where a directed dependency relationship can be defined.

In embodiments of the method for assigning classes (e.g. programming language (e.g. Java™) classes, modules, applets, servlets, helpers and beans, among others) to class loaders based on the dependency between the various classes for an application configured to use a plurality of classes, a plurality of normalized groups of the plurality of classes is generated. Each group may include one or more classes. In one embodiment, non-interdependent classes and sets of interdependent classes among the plurality of classes are identified, and the non-interdependent classes and the sets of interdependent classes are grouped into the plurality of groups. Each group includes either a plurality of interdependent classes or one or more non-interdependent class, and each of the plurality of classes is a member class in exactly one of the plurality of groups. A non-cyclical directed dependency relationship of the plurality of groups is determined from the relationships between one or more member classes in each of the plurality of groups and one or more member classes in one or more other groups.

A plurality of subsets of the plurality of groups is then determined from the directed dependency relationship of the plurality of groups. In one embodiment, for each group that is dependent on only one other group, the one other group is assigned to a subset including the one other group. A class loader assigned to the subset including the one other group is a parent in the hierarchical stack of the class loaders of a class loader assigned to the particular group that is dependent on the one other group. For each group that is dependent on two or more other groups, the two or more other groups are assigned to a subset including the two or more other groups. A class loader assigned to the subset including the two or more other groups is a parent in the hierarchical stack of the class loaders of a class loader assigned to the particular group that is dependent on the two or more groups. A class loader is assigned to each determined subset of the plurality of groups. Each class loader is configured to load the one or more classes in its associated subset of the groups.

A hierarchical stack of the class loaders, configured for use by the application in reloading changed classes during execution of the application, is generated. In one embodiment, a hierarchical relationship of the plurality of class loaders is determined from a dependency relationship of the plurality of subsets of the groups, and the hierarchical stack of class loaders is generated from the hierarchical relationship of the plurality of class loaders. In one embodiment, a transformation of the hierarchical relationship may be performed in generating the hierarchical stack of class loaders. In one embodiment, the transformation may generate a transitive closure of the hierarchical relationship of the plurality of class loaders, and the hierarchical stack of class loaders is generated from the transitive closure. In one embodiment, the transformation may generate a reduction of the hierarchical relationship of the plurality of class loaders, and the hierarchical stack of class loaders is generated from the reduction of the hierarchical relationship of the plurality of class loaders. In this document, a reduction of a graph or relationship is a computable or otherwise determinable transformation of one graph or relationship into another (not to be confused with transitive reduction, which is one particular kind of reduction). In one embodiment, the reduction may generate an equivalent form of the hierarchical relationship of the plurality of class loaders, which may include a reduced number of edges between vertices. In one embodiment, the transformation may generate a transitive reduction of the hierarchical relationship of the plurality of class loaders. The transitive reduction of a directed graph G is the directed graph G' with the smallest number of edges such for every path between vertices in G, G' has a path (direct or indirect) between those vertices. Some embodiments may use transformations other than transitive closures and reductions (e.g. transitive reductions) of the directed graph to generate the hierarchical stack of class loaders.

While the class dependency graph-based class loading and reloading mechanism is described herein in respect to applications in application servers, it is noted that embodiments of the class dependency graph-based class loading and reloading mechanism may be used in any other application area that requires the dynamic reloading of components such as classes. For example, the class dependency graph-based class loading and reloading mechanism may be applied to Java™ programs and/or other object-oriented language programs executable within Java™ Virtual Machines and/or other operating environments. In general, embodiments of the class dependency graph-based class loading and reloading mechanism as described herein are flexible enough to be used by any applications, including enterprise applications, which require the dynamic reloading of components such as classes.

Figure 1:
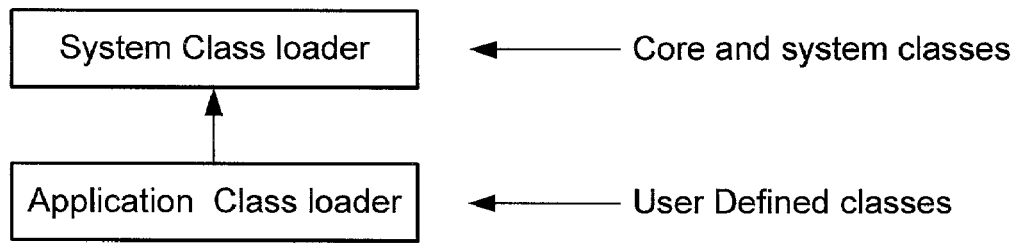
FIG. 1 illustrates prior art architecture of a class reloading mechanism.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

Embodiments of a system and method for providing class dependency graph-based class loading and reloading may be used to segregate namespaces in a graph-centric way, and may provide a set of normalized topologies that may be used to efficiently support hot-swapping of programmatic logic such as classes, applets, helpers and beans, among other applications. Hot-swapping refers to the replacement (also referred to as "reloading") of the programmatic logic with similar programmatic logic while software and/or hardware using the program logic remains in operation. In this document, the term "class" may include the notion of various types of programmatic logic, logical units, and components, including programming language (e.g. Java™) classes, modules, applets, servlets, helpers and beans, among others, that may be "swappable" or reloadable in an application.

Embodiments may provide a domain-independent, flexible and robust namespace segregation technique that may be independent of platform-specific roles (e.g. servlet, bean, helper, etc.). These embodiments may be based on the dependency between the various classes and not necessarily on details such as the roles the classes play. The problem of segregating namespaces is formulated as a graph theory problem, and a solution to the problem is found through graph techniques. In some embodiments, the graph may be normalized by identifying and grouping interdependent classes, keeping non-interdependent classes in separate groups. A directed dependency relationship of the groups is determined using the relationships between the member classes of the groups. This method may be applied to any set of dependent logical units where a directed dependency relationship can be defined.

While the class dependency graph-based class loading and reloading mechanism is described herein in respect to applications in application servers, it is noted that embodiments of the mechanism may be used in various other application areas that require the dynamic reloading of components such as classes. For example, embodiments of the mechanism may be applied to Java™ programs and/or other object-oriented language programs executable within Java™ Virtual Machines and/or other operating environments. In general, embodiments of the class dependency graph-based class loading and reloading mechanism as described herein are flexible enough to be used by any applications, including enterprise applications, which require the dynamic reloading of components such as classes.

Figure 2:
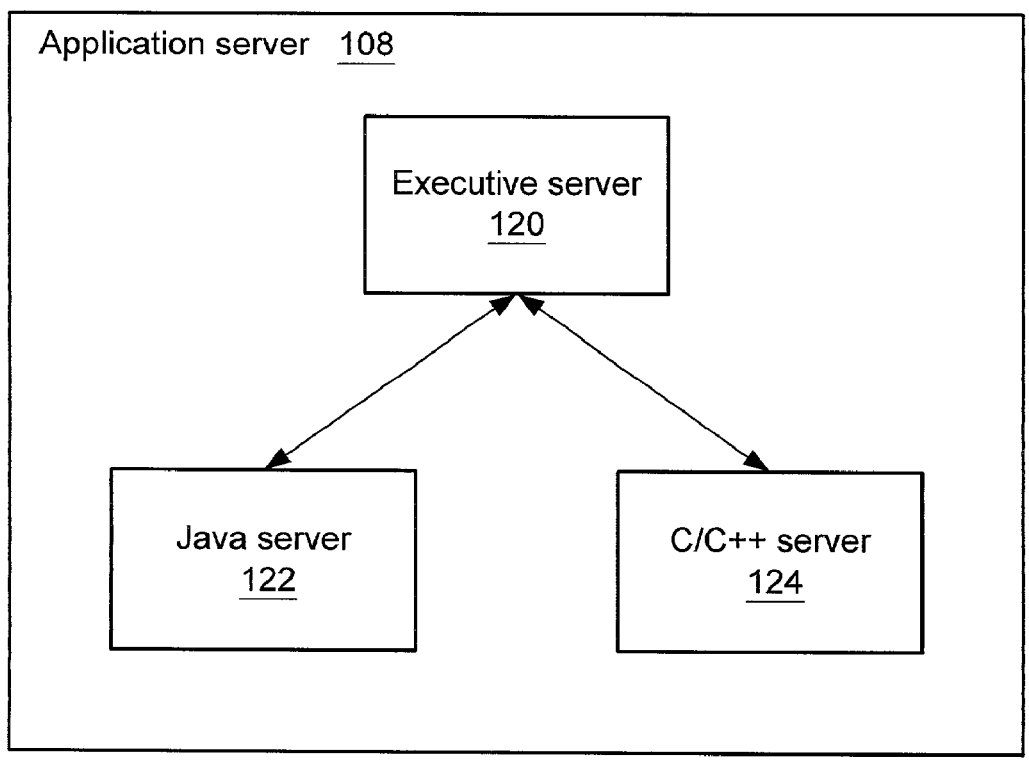
FIG. 2 is a block diagram illustrating one embodiment of an application server and processes that run on the application server.

FIG. 2 illustrates an application server 108 according to one embodiment. Applications that run on application servers 108 are often constructed from various types of software components or modules. These components may include components constructed according to a standard component model. For example, an application may comprise various types of standard Java™ components such as Enterprise JavaBeans™ components, JavaServer Pages™, Java™ Servlets, etc. An application may also comprise any of various other types of components, such as Common Object Request Broker Architecture (CORBA) components, Common Object Model (COM) components, or components constructed according to various proprietary component models.

Each request that an application server 108 receives from a client may reference a particular application component. Upon receiving a request, the application server 108 may determine the appropriate component, invoke the component, and return the execution results to the client.

An application server 108 may include components that run in different environments, for example components written using the Java™ programming language and components written using the C or C++ programming languages. The different types of components may be managed by particular processes or engines. For example, FIG. 2 illustrates an application server 108 in which a process referred to as the "executive server" 120 interfaces with a process 122, referred to as a "Java™ server" and a process 124 referred to as a "C/C++ server." In this example, the executive server 120 may receive client requests, assign the client requests to a particular thread, and forward the requests to either the Java™ server 122 or the C/C++ server 124, depending on whether the requests reference a component that executes within a Java™ runtime environment or a C/C++ runtime environment. The Java™ server or C/C++ server may then load and execute the appropriate component or module.

In complex software development scenarios, dynamism may be an important feature in the components being built. The same holds true for an application server's application execution capabilities. Application developers tend to look for more in terms of security and the dynamic maintainability of applications. In various embodiments, an application server 108 may allow some application components, such as Java™ Servlets and JavaServer Pages™, to be dynamically reloaded while the server is running. This enables programmers and/or administrators to make changes to an application without restarting. Having to stop/restart an application may be a serious problem in many situations. Administrators may specify which classes are to be considered "versionable", or dynamically reloadable. If only certain classes can be reloaded, then modification of classes that cannot be dynamically reloaded typically requires the restart of the whole system.

In one embodiment, an application server may be based on the Java™ 2 Enterprise Edition (J2EE™) distributed computing model. The application server 108 may feature support for the J2EE™. An example of an application server 108 based on the J2EE™ is the iPlanet™ Application Server (iAS). In the J2EE™ application arena, the class spectrum may be broadly classified as:

Standard Java™ classes (java.*, javax.*, etc.)

Application server core classes (com.kivasoft.*, com.netscape.*, etc.)

User-defined classes (servlets, JSPs, EJBs; utility/helper classes).

Embodiments of the class dependency graph-based class loading and reloading mechanism as described herein enable the dynamic changing of the functionality of applications running within an application server 108 without requiring the restart of the server. Embodiments may be used to organize class loaders for the dynamically reloadable components in a directed graph of class loaders based on the dependency between the various classes, and not necessarily on details such as the platform-specific roles (e.g. servlet, bean, helper, etc.) the classes may play. Using embodiments of the class dependency graph-based class loading and reloading mechanism, only a changed class and its dependent classes are reloaded, thus limiting the number of classes that are affected in the application server 108.

Embodiments of the class dependency graph-based class loading and reloading mechanism as described herein may be used with Java™ 2 Enterprise Edition (J2EE™) applications in application servers 108. In one embodiment, the application server 108 may be an iPlanet™ Application Server (iAS). In application servers 108 such as iAS™ which are based on the J2EE™ distributed computing model, the business presentation is typically represented using servlets and/or JavaServer Pages™ (JSPs), and the business logic typically runs in the form of distributed components such as Enterprise JavaBeans™ (EJBs). Embodiments of the class dependency graph-based class loading and reloading mechanism may provide dynamic reloading of servlets, JSPs, EJBs and any other user-provided Java™ class based on the dependency between the various classes, and not necessarily on details such as the roles (e.g. servlet, bean, helper, etc.) the classes may play.

In one embodiment, the application server may include a plurality of applications executable within the application server, and one or more of the applications may include an implementation of an application-specific class dependency graph-based class loading and reloading mechanism configured for use in loading and reloading classes for the particular application. In another embodiment, an application server may include a single class dependency based class loading and reloading mechanism that may be shared among a plurality of applications.

FIG. 2 represents an exemplary application server 108 in which embodiments of the class dependency graph-based class loading and reloading mechanism may be implemented, and various other embodiments are contemplated. For example, although FIG. 2 is discussed in terms of Java™ and C/C++ components, various other processes or engines may be present for executing other types of software components or modules, and embodiments the class dependency graph-based class loading and reloading mechanism may be used for dynamically reloading the other software components or modules. In addition, various embodiments may be used in application servers that support multiple component management processes, e.g. multiple Java™ server processes or C/C++ server processes.

Figure 3A:
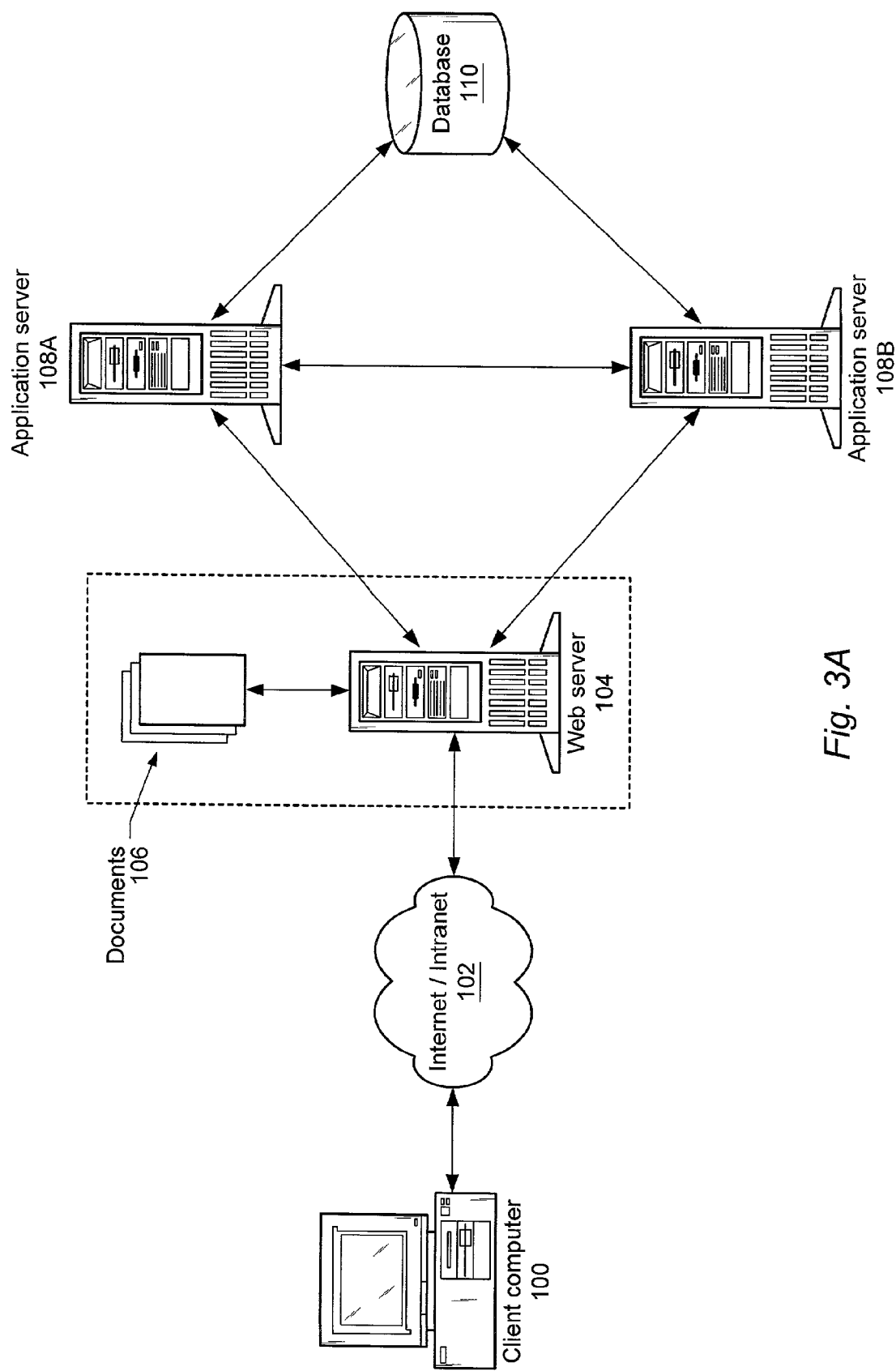
FIGS. 3A and 3B illustrate exemplary architectures for networked applications running on application servers.

FIG. 3A illustrates an exemplary architecture for a web application. In general, a web application may be defined as an Internet or Intranet-based application comprising a collection of resources that are accessible through uniform resource locators (URLs). The resources may include web pages comprising HTML, XML, scripting code such as Javascript or VBScript, or other types of elements. The resources may also include any of various types of executable programs or components, such as CGI programs, Java™ servlets, JavaBeans™ components, CORBA components, downloadable code such as Java™ classes or ActiveX components, etc. The resources may also include any other type of resource addressable through a URL.

The embodiment of FIG. 3A illustrates a client computer 100 running a web browser, such as the Netscape™ Navigator or Microsoft™ Internet Explorer web browsers. It is noted that the web-browser need not be a web browser per se, but may be any of various types of client-side applications that include web-browsing functionality. For example, Microsoft™ Corp. provides programming interfaces enabling applications to incorporate various web-browsing capabilities provided by the Microsoft™ Internet Explorer code base.

The web browser may run in any type of client computer 100. For example, the web browser may run in a desktop computer or workstation running any of various operating systems, such as Windows, Mac OS, Unix, etc., or the web browser may run in a portable computing device, such as a personal data assistant, smart cellular phone, etc. The client computer 100 may use a network connection for communicating with a web server 104 via a network 102, such as the Internet or an Intranet. The client network connection may be a connection of any type, such as a PPP or SLIP dialup link, an Ethernet or token ring connection, an ISDN connection, a cable modem connection, any of various types of wireless connections, etc. Although web applications are often associated with particular communication protocols, such as HTTP or SSL, it is noted that any communication protocol, including TCP-based protocols and UDP-based protocols, may be used to communicate over the network 102.

The application servers 108 may be configured as a part of an application server cluster, as described above and shown in FIG. 3A. Although FIG. 3A illustrates an application server cluster with only two application servers, it is noted that the cluster may comprise any number of application servers. Each application server may interface with various types of other servers or systems. For example, as illustrated in FIG. 3A, the application servers may communicate with a database 110. Each application server in the cluster may interface with the same systems, or the application servers may differ in which systems they interface with. For example, application server 108B may interface with a legacy system (not shown). Application servers in a cluster may not need to be in close physical proximity to each other.

It is noted that, in alternative embodiments, a web server may be included as a part of an application server. For example, in one embodiment, one or more of application servers 108 may include containers in which web server applications execute to provide web access to database 110.

Figure 3B:
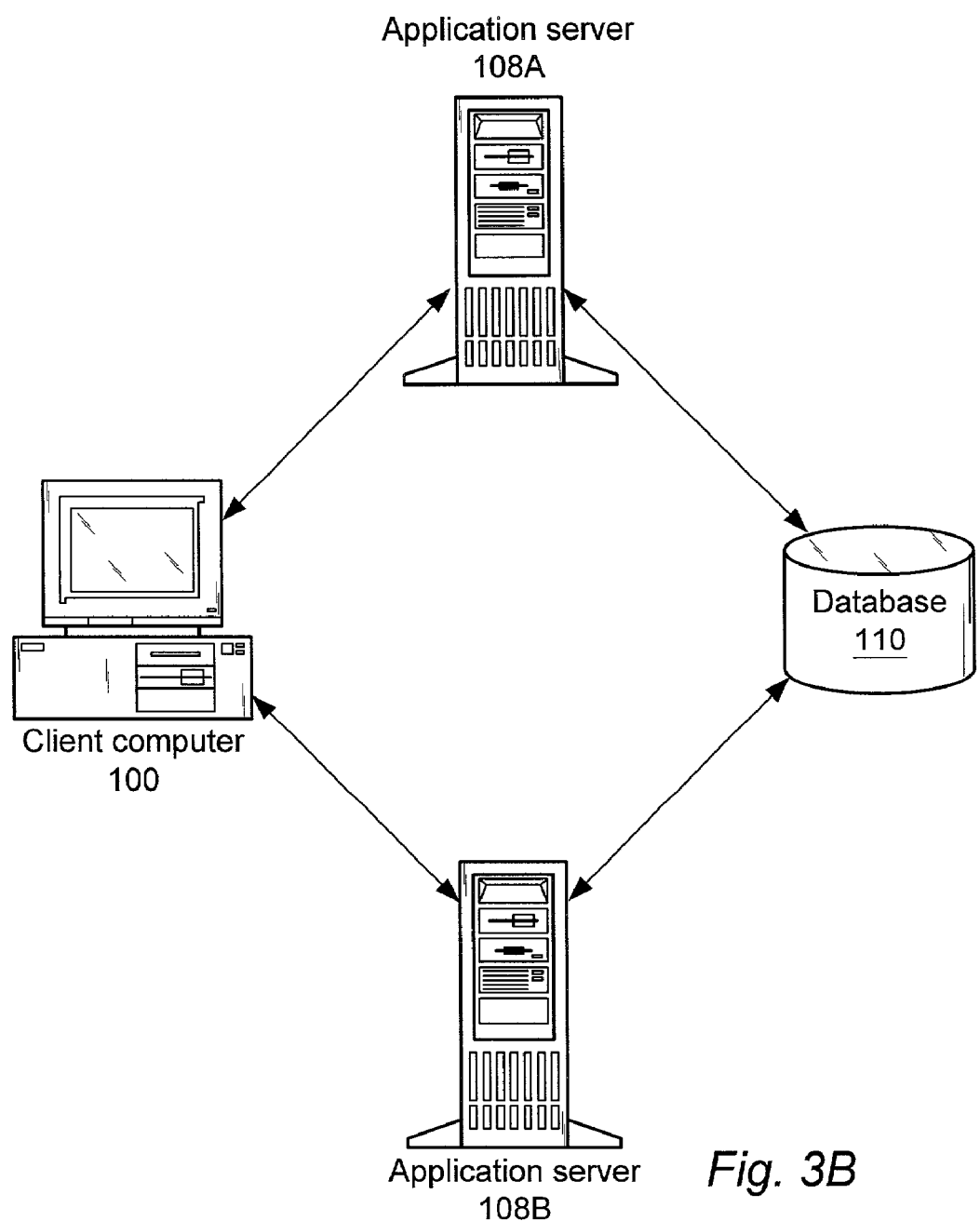

It is also noted that, in alternative embodiments, a client computer may communicate directly with an application server or application server cluster, without interfacing through a web server. FIG. 3B illustrates a client computer 114 communicating directly with application servers 108. For example, the application servers may run an enterprise resource planning application, and the client computer 114 may be a computer within the enterprise that is connected to the application servers via a WAN. In this example, the client computer may run "thick client" software, e.g., client software that comprises a portion of the enterprise resource planning application logic. The client computer software may interface directly with executable programs or components running on the application servers, e.g. through a protocol such as the Internet Inter-Orb Protocol (IIOP).

As noted above, FIGS. 3A and 3B are exemplary architectures only, and many variations are possible. As a small handful of examples of alternative embodiments, multiple web servers may be present to receive requests from client computers and broker the requests to application servers, the web server may itself interface directly with a database, application servers may interface with various other types of systems, such as specialized authentication servers, e-commerce servers, etc.

Embodiments of the class dependency graph-based class loading and reloading mechanism as described herein may be used on one or more of the applications servers 108, the web server 104, and the client computer 100 of FIGS. 3A and 3B to organize class loaders for dynamically reloadable components in a hierarchical stack of class loaders based on the dependency between the various classes, and not on details such as the platform-specific roles (e.g. servlet, bean, helper, etc.) the classes may play. Using embodiments of the class dependency graph-based class loading and reloading mechanism, only a changed class and its dependent classes are reloaded, thus limiting the number of files that are affected.

Figure 4:
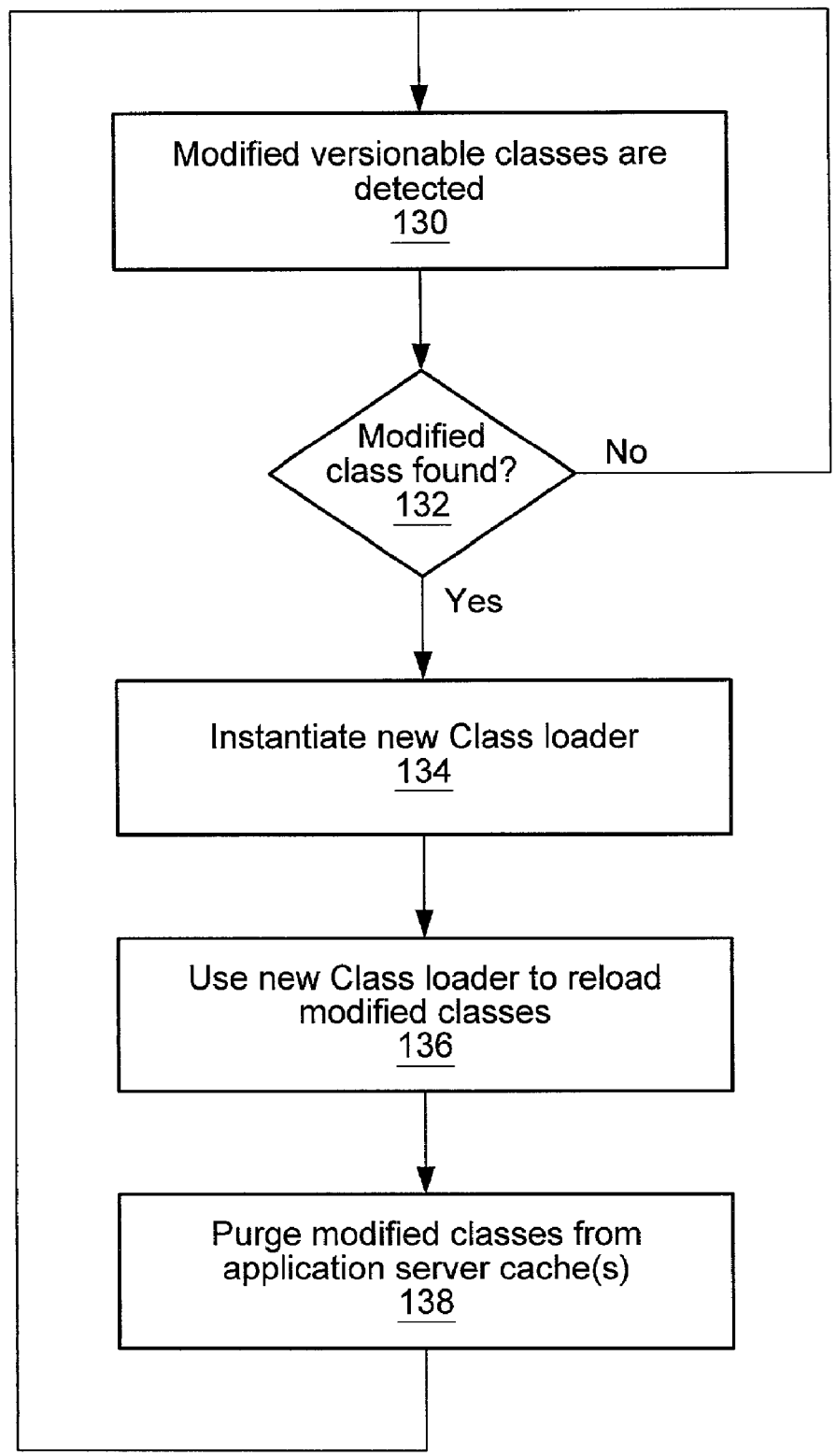
FIG. 4 is a flowchart illustrating one embodiment of a method for dynamically discovering and reloading classes.

FIG. 4 is a flowchart illustrating one embodiment of a method for dynamically discovering and reloading classes. One or more modified classes may be detected as indicated at 130 of FIG. 4. In one embodiment, a thread may execute to check for modified classes. In other embodiments, modified classes may be indicated by other events, for example through notification by an administrator or programmatic notification, among others.

In some embodiments, a thread may be a "timed" thread that periodically executes to check for modified classes. It is noted that, when checking for modified classes, it may only be necessary to check for changes in certain classes, since classes may not be versioned by default. In one embodiment, the list of versionable classes may be determined once, and the list may be reused by the thread each time the thread executes. If an administrator changes the versionability settings, the list may be updated. Each class in the list may be checked for modifications in any way appropriate for a particular environment. For example, the application server may record the date and time of the class file when the class is first loaded and may check to determine whether the file has since been modified. As indicated at 132, if no modified versionable classes are found, in embodiments, where a thread is periodically executing to check for changed classes, the thread may return to sleep.

If one or more modified classes are found, then 134–138 may be performed for each modified class. As indicated at 134, a new class loader is instantiated (e.g. reloaded). As indicated at 136, the class loader instantiated in step 134 is used to reload the modified class. As indicated at 138, the modified class may be purged from any caches maintained by the application server. As described above, any application server components that maintain caches may provide interfaces for purging a modified class from the cache.

Figure 5:
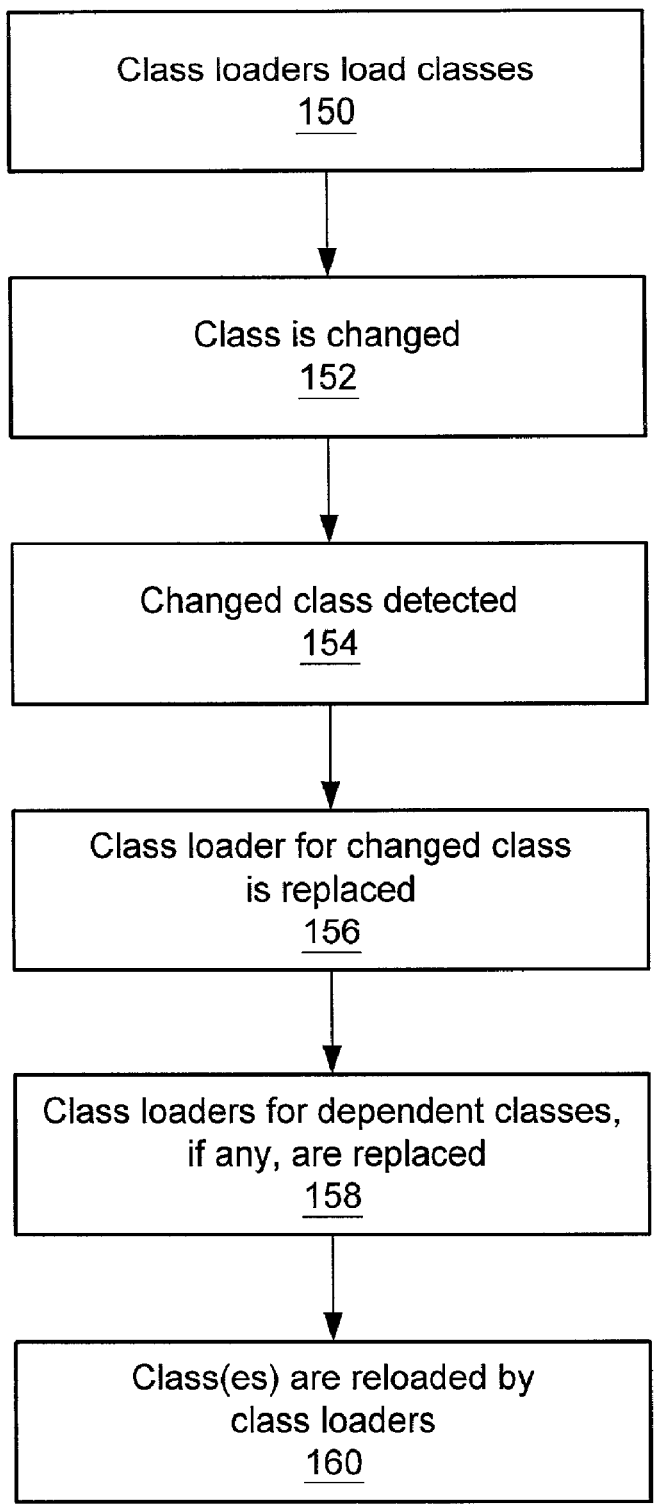
FIG. 5 is a flowchart illustrating a method for providing dynamic class reloading in applications according to one embodiment.

FIG. 5 is a flowchart illustrating a method for providing dynamic class reloading, including dependent classes, in applications according to one embodiment. As illustrated at 150, one or more class loaders may, when necessary, load classes for an application. In one embodiment, the application may include a hierarchical stack of class loaders that are each configured to load one or more classes for the application when invoked. As indicated at 152, at some point one or more of the classes used by the application may be changed. For example, a programmer may make a modification to a class. As indicated at 154, the application may detect that a class has been changed. As indicated at 156, the class loader for the class may be replaced with a new version of the class loader configured to load the changed class. As indicated at 158, if there are one or more classes that depend on the class to be reloaded, the class loaders responsible for reloading the dependent classes may be located and replaced as well. If one or more of the dependent classes are loaded by the same class loader that is responsible for loading the changed class, then the class loader may only be replaced once. After replacing the class loader(s), the new class loader may load the changed class (which may be referred to as "reloading the class") as indicated at 160. In one embodiment, dependent classes, if any, may also be reloaded by their respective class loaders.

In one embodiment, the applications as described in FIGS. 4 and 5 may be executing within an application server. The application server may include a plurality of applications executable within the application server, and one or more of the application may include an application-specific, hierarchical stack of class loaders configured for use in loading and reloading classes for the particular application.

Embodiments of the class dependency graph-based class loading and reloading mechanism as described herein may be used to organize the class loaders for dynamically reloadable components as described in FIGS. 4 and 5 in a hierarchical stack of class loaders based on the dependency between the various classes, and not necessarily on details such as the platform-specific roles the classes may play. Using embodiments of the class dependency graph-based class loading and reloading mechanism, only a changed class and its dependent classes are reloaded, and only the class loaders responsible for loading the classes are replaced by new class loaders, thus limiting the number of files (e.g. class loaders) that are affected.

It is noted that FIGS. 4 and 5 represent exemplary embodiments of methods for dynamically reloading classes. The methods may be implemented in software, hardware, or a combination thereof. The order of method may be changed, and various elements may be added, reordered, combined, omitted, modified, etc.

Graph-Centric Segregation of Namespaces

FIGS. 6–15 illustrate embodiments of a method for segregating namespaces in a graph-centric way that may be used in generating the class dependency graph-based hierarchical stack of class loaders used in the loading and reloading mechanism as described herein. Embodiments of the method as described herein may be implemented in software, hardware or a combination thereof. Embodiments of the method as described herein may be implemented on any of a variety of computing devices, including, but not limited to, personal computers, servers, workstations, laptops, notebook computers, mainframes and even supercomputers, among others. Embodiments of the method may be implemented in any of a variety of computing languages, including, but not limited to, Java™ and C/C++. In some embodiments, the method may be implemented as an automated process, with a set of classes as an input and the hierarchical stack of class loaders as the output. In other embodiments, the method may be implemented as a user-controlled process, for example by providing a graphical user interface (GUI) to allow the user, through input to the GUI, to specify the classes, the dependencies among the classes, and perform or control the various functions to generate the hierarchical stack of class loaders. Some embodiments may combine user-controlled and automated processes, thus allowing the automated processes to be controlled by the user through input to a GUI, and allowing the user to modify results of various automated steps.

The following is a mathematical expression for one embodiment of a method for segregating namespaces in a graph-centric way:

1) Let C be the set of all the classes being considered.
2) Some classes may be dependent on some others. To model this, relationship R, from the set C, onto itself, is defined as:

$$R: C \rightarrow C$$

$$R=\{(c1,c2): c1 \text{ depends on } c2 \text{ directly}, \forall c1,c2 \in C\}$$

3) A relationship R1 is defined:

$$R1: C \rightarrow C$$

$$R1=\{(c1, c2): c1 \text{ depends on } c2 \text{ directly/indirectly}, \forall c1, c2 \in C\}$$

R1 is the transitive closure of R. R1 has the following properties:

$$(c1,c2) \in R \Rightarrow (c1,c2) \in R1$$

$$(c1,c2),(c2,c3) \in R \Rightarrow (c1,c3) \in R1$$

$$R \subseteq R1$$

The transitive closure is used to model the notion of "somehow reachable." If c1 can somehow reach c2 in R, (c1, c2) will be present in R1

4) Let the set L of disjoint subsets of C be defined as:

$$L=\{l: l \subseteq C, \cap l=C, \cap l \neq \phi, R1:l \rightarrow l \text{ is commutative},$$

$$R1:l \cup \{c\} \rightarrow l \cup \{c\} \text{ is not commutative } \forall c \in C, c \notin l\}$$

The elements of L would be the normalized groups.

5) The relationship $P:L \rightarrow L$ is found such that the following constraints are met for $P1:L \rightarrow L$, the transitive closure of P:

$$(c1,c2) \in R1 \Rightarrow (l1,l2) \in P1,$$

$$(l1,l2) \in P1 \Rightarrow (l2,l1) \notin P1$$

$$\forall l1, l2 \in L, c1 \in l1, c2 \in l2$$

In the transitive closure, the required classes are preferably somehow accessible. If the required classes are somehow accessible, then the classes must be there in the transitive closure. If the required classes are not accessible, then the two groups will not have an edge between them in the transitive closure.

6) After L and P are known, the problem is reduced to the assignment of a class loader to each of the normalized groups (i.e. the elements of L).

To segregate namespaces in a graph-centric way, the problem is reduced to a series of graph problems, and the graph problems are solved. The problem may be visualized as a corresponding graph theoretic dual. Consider R as a graph. The dependencies form an edge in the graph. This forms a directed graph without requiring the redefinition of anything. A directed graph is a graph whose edges are ordered pairs of vertices. That is, each edge can be followed from one vertex to the next.

Similarly, R1, L and L1 may also be considered as graphs. Therefore, the problem definition stays the same as in 1)–6) above. C is the set of classes being considered. R is the graph whose nodes belong to C and edges represent dependencies between the nodes. R1 is the transitive closure of the graph R. L retains the same role as the set. P represents the portioned graph, and L includes the nodes for P. This forms an intermediate solution. The mapping is done from the graph P. All the identifiers of the relationships represent the corresponding graph.

Figure 6:
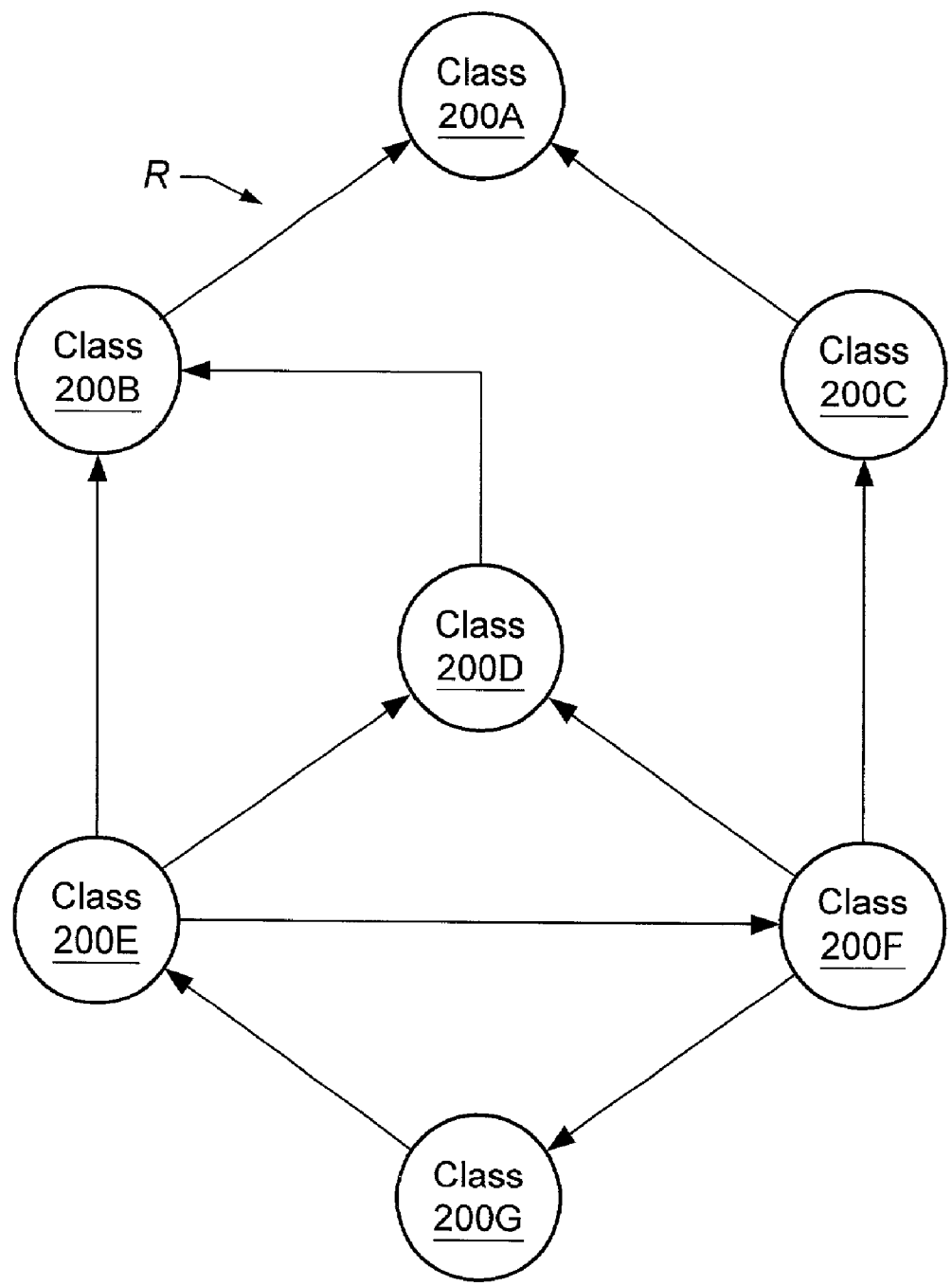
FIG. 6 illustrates a graph of an exemplary set of classes C and an exemplary dependency graph R of the set of classes C.

FIG. 6 illustrates a graph of an exemplary set C of classes 200 and an exemplary dependency graph R of the set of classes 200. The set of classes 200 to be considered, C, is specified as a problem input. In some embodiments, C may be constructed from the class path. In one embodiment, the relationships between the various classes 200 may be deduced from the class file. In one embodiment, the pool of classes selected for C may include some or all classes 200 which are to be monitored for potential reloading. Each class 200 in C may provide one or more edges in R starting from the class in question. Repeating this process for all the classes 200 in C gives us the graph R, with the classes 200 as nodes of the graph R.

Figure 7:
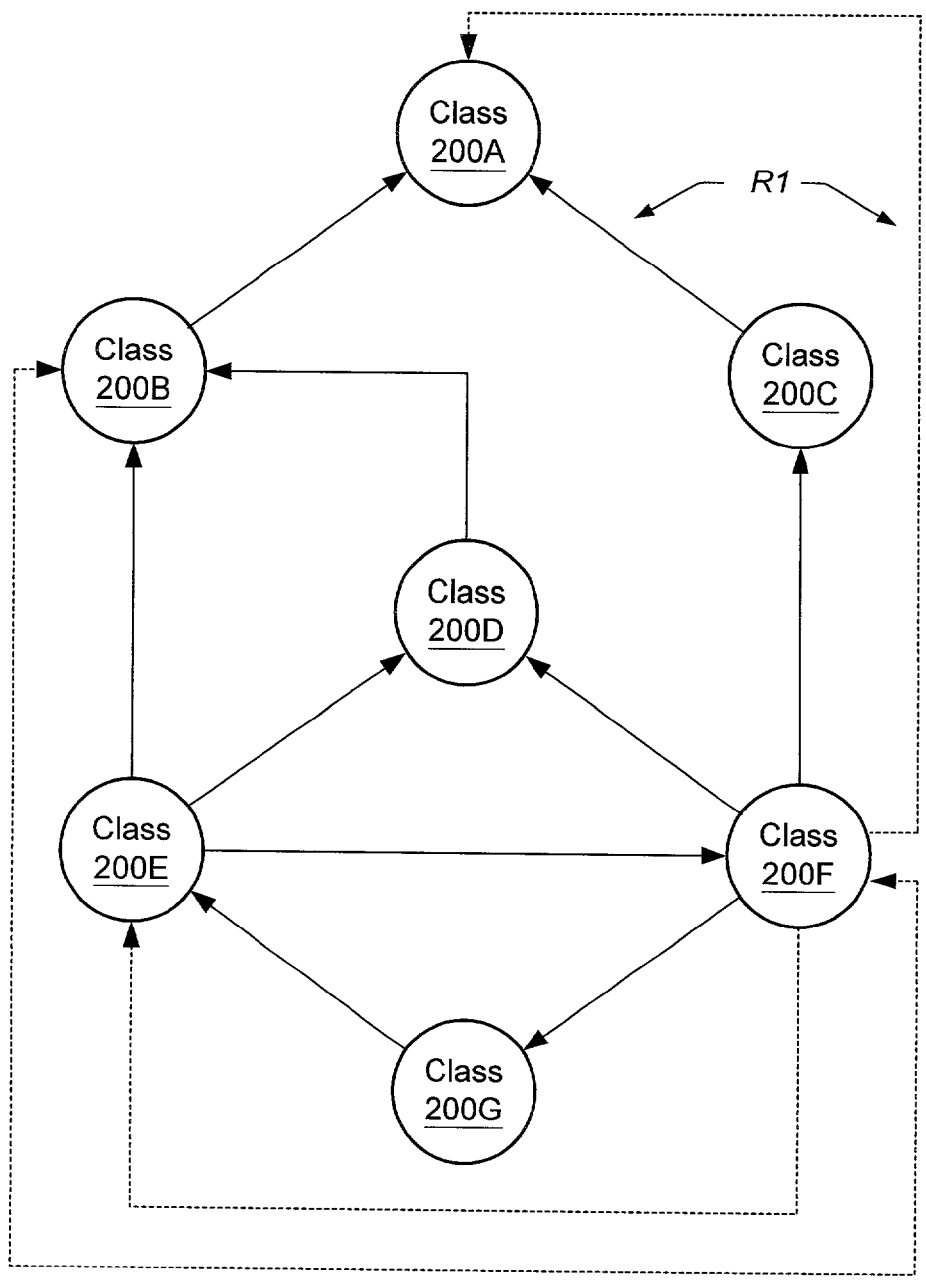
FIG. 7 illustrates the transitive closure R1 of the exemplary graph R of FIG. 6 according to one embodiment.

FIG. 7 illustrates the transitive closure R1 of the exemplary graph R of FIG. 6 according to one embodiment. R1 may have one or more other indirect connections as shown by the dashed lines in FIG. 7. In FIG. 7, the indirect connections are shown for only one of the nodes (i.e. classes). Others of the nodes may also have such indirect connections which are not shown for simplicity but which are necessary for R1 to be a transitive closure of R. After generating R1, L and P may be obtained.

Figure 8:
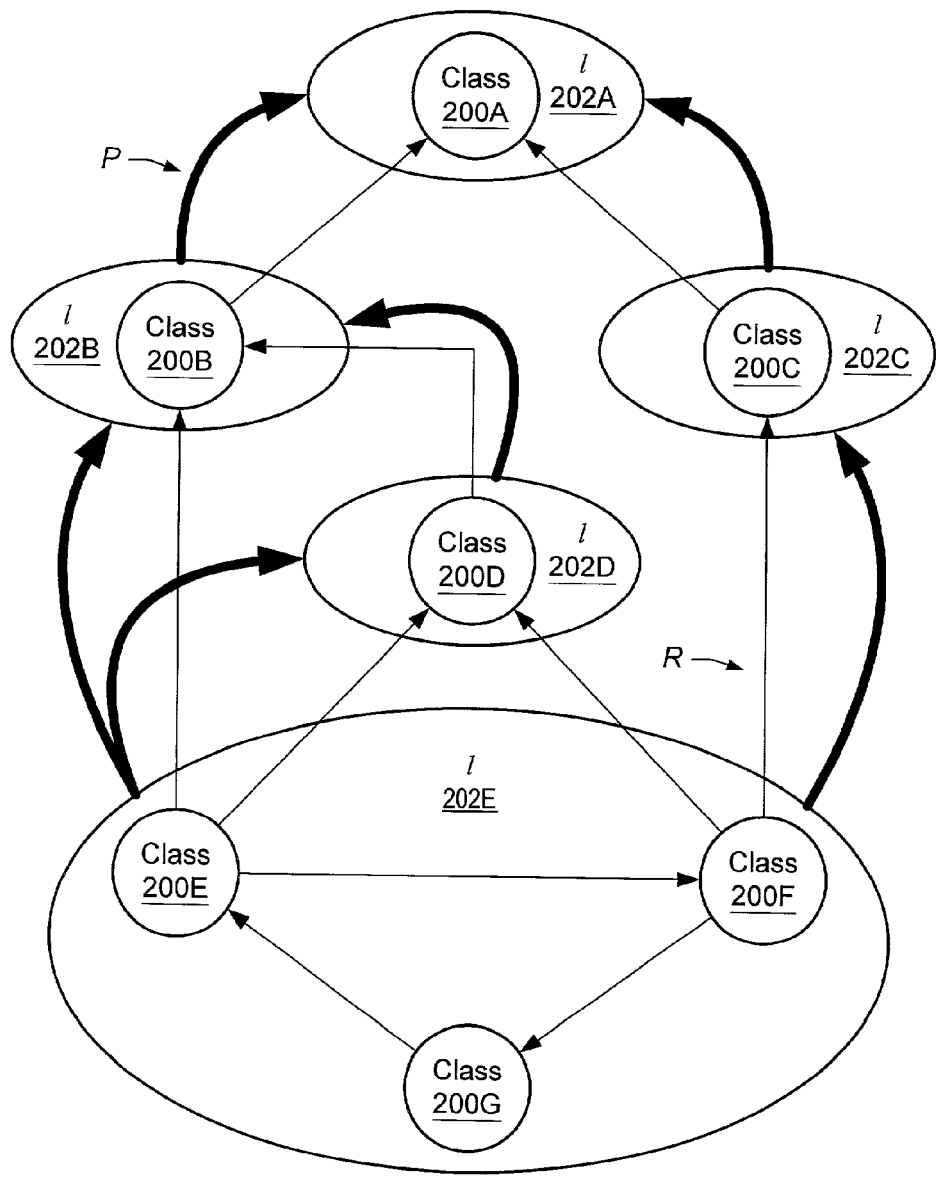
FIG. 8 illustrates an exemplary L (the disjoint subsets of C) and P, the portioned graph.

FIG. 8 illustrates an exemplary L (comprising the disjoint subsets or groups 1 202 of the classes 200 in C) and P, the portioned graph. The groups 1 202 of L are the nodes for P. L and P are preferably obtained such that the constraints specified in 4) of the mathematical expression shown above are met. In one embodiment, obtaining L and P under the constraints of 4) may be performed by detecting the strongly connected components of R1. Given a directed graph, a strongly connected component of the graph is a set of nodes such that for any pair of nodes u and v in the set there is a path from u to v. In general, a directed graph may have one or many strongly connected components. The strongly connected components of a graph may be referred to as a disjoint set of nodes. A disjoint set is a set whose members do not overlap, are not duplicated, etc.

One skilled in the art will recognize that various algorithms exist for identifying the strongly connected components of a directed graph, implementations of which may be used to find the strongly connected components of a graph. Such methods include serial and parallel methods, including variations of Tarjan's algorithm. One exemplary method that may be used is described by E. Nuutila and E. Soisalon-Soininen (*On finding the strongly connected components in a directed graph*. Information Processing Letters, 49:9–14). Another exemplary method that may be used is described by Tada Akio and Nakamura Ryozo (*An Effective Parallel Algorithm for Finding Strongly Connected Components of a Sparse Directed Graph*, IPSJ (Information Processing Society of Japan) SIGNotes ALgorithms Abstract No. 066-009).

Figure 9:
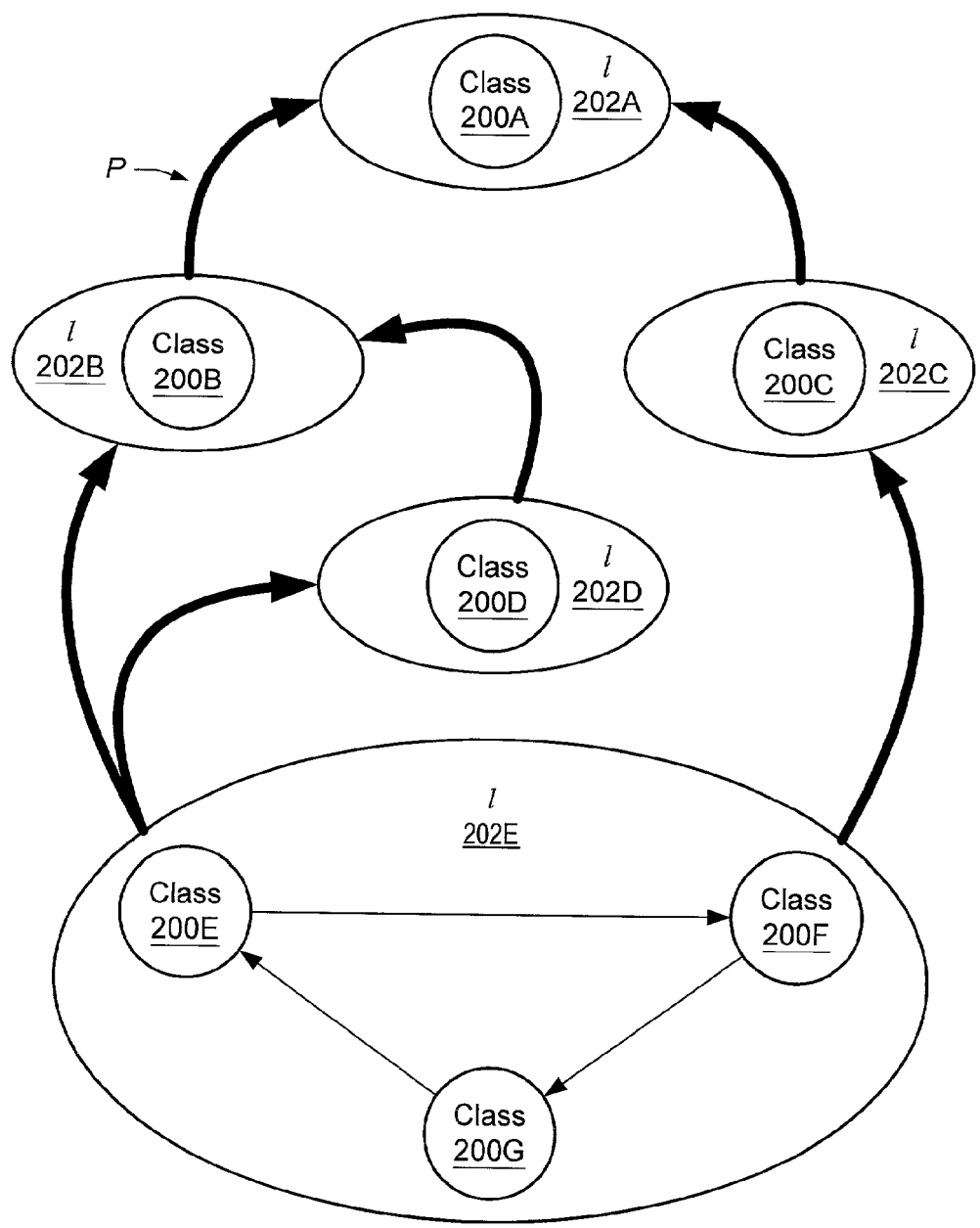
FIG. 9 illustrates a non-cyclical graph of groups of classes according to one embodiment.

After replacing all cycles in the graph R1 with single nodes (the groups 1 202), the transformation from C to L has been achieved. In graph theory, a cycle is a path in a graph that starts and ends at the same vertex (node) and includes other vertices at most once. An acyclic graph of groups of classes 1 202 has been generated, as illustrated in FIG. 9. An acyclic graph is a graph with no path that starts and ends at the same vertex and repeats no other vertex. This acyclic dependency graph may be referred to as P.

Figure 10:
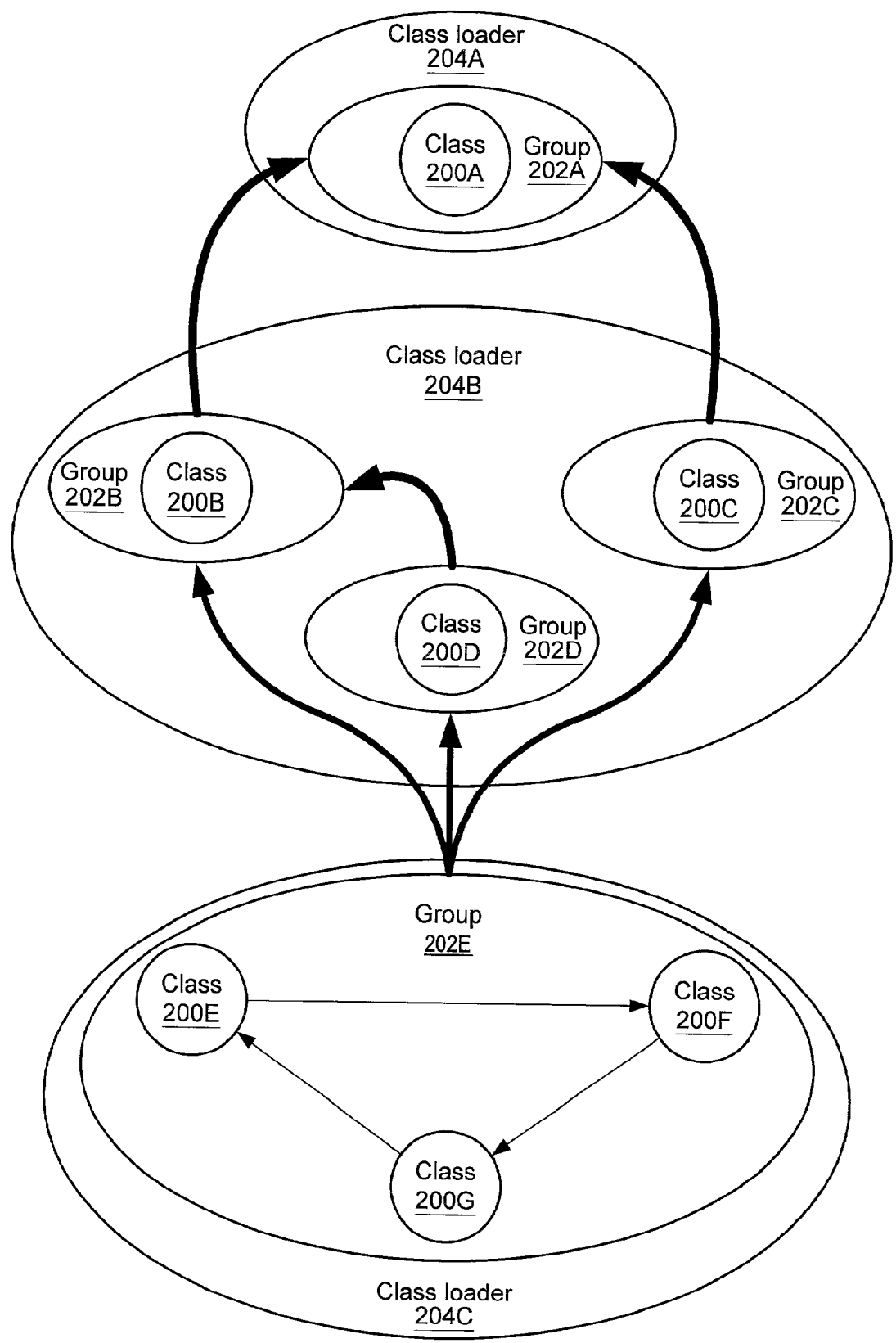
FIG. 10 illustrates a single parent class loader tree according to one embodiment.

After generating L and P, the class loaders are assigned. FIG. 10 illustrates an exemplary assignment of class loaders 204 according to one embodiment. The class loaders 204 and their relationships may be determined from the acyclic dependency graph P of groups 1 202 of cyclically dependent classes 200. In some embodiments, the class loaders 204 may be assigned using a delegation model. In one embodiment, a Java™ Development Kit (JDK™) delegation model may be used to assign the class loaders 204. Other embodiments may use other methods of assigning class loaders 204.

In an embodiment using JDK™ delegation for assigning class loaders, all of class loaders 204 (except the highest-level, e.g. system class, loader) have a parent class loader. This parenting hierarchy is typically rooted at the system class loader. In FIG. 10, for example, class loader 204A is the highest-level class loader, and thus has no parent class loader. The parent class loader 204 is asked to load a class 200 before attempting to load the class 200 in the current (child) loader 204. If the dependent classes 200 are all in the parent or the current class loader 204, all dependencies can be resolved.

In one embodiment, each of the elements of L may be assigned to a class loader 204. Next, the parent-child relationship of the class loaders 204 may be defined. In one embodiment, P may be traversed, and for each node (class loader 204) that has a single dependency, the dependency is assigned as a parent. For nodes with no dependencies (e.g.

the highest-level or system class loader), no parent is assigned. For nodes with multiple dependencies, all of the dependencies may be grouped into one class loader 204 (e.g. class loader 204B of FIG. 10), and thus the nodes with multiple dependencies are assigned a single parent class loader. Thus, P is mapped or reduced into a single parent class loader tree as illustrated in FIG. 10.

Figure 11:
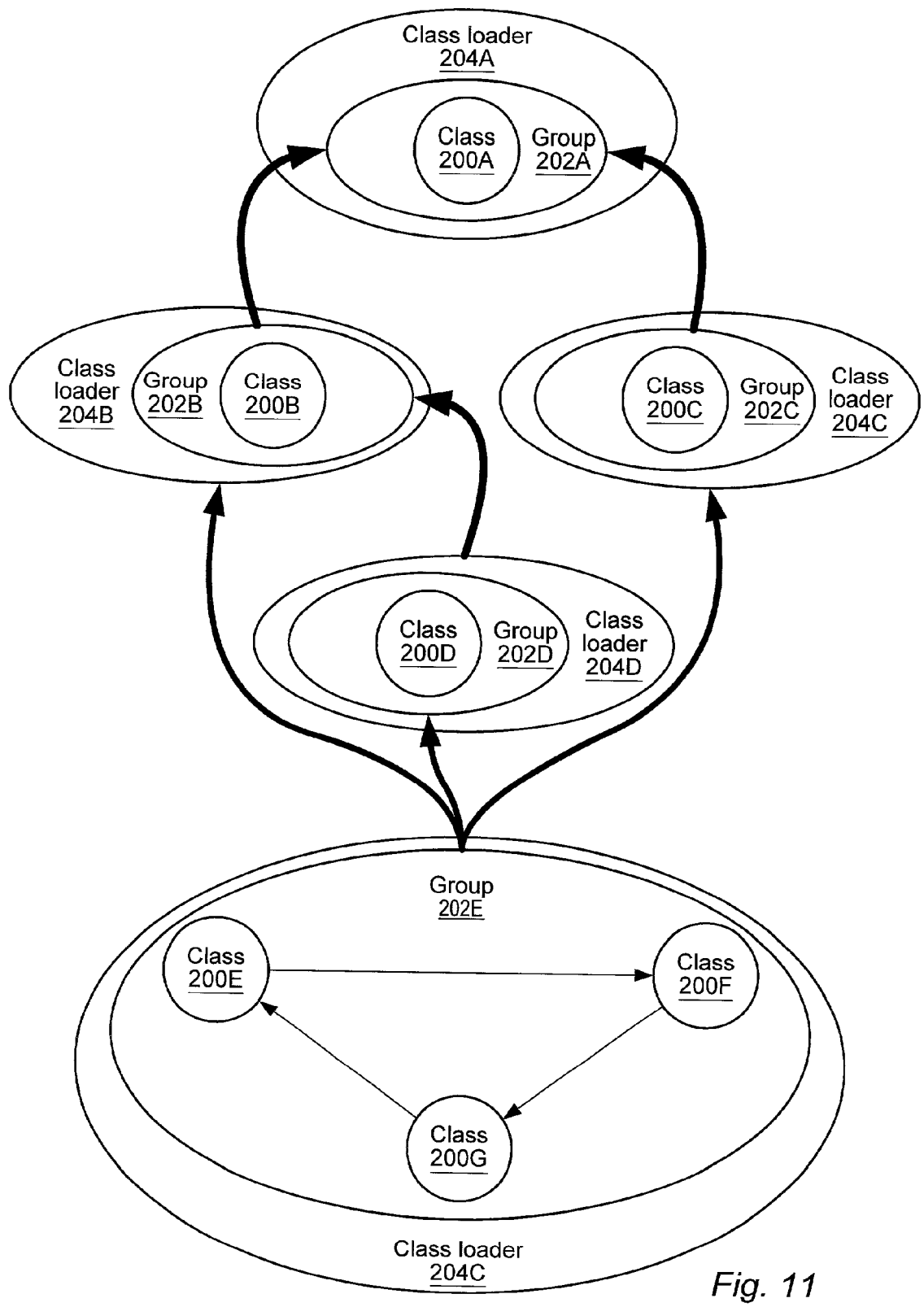
FIG. 11 illustrates a mapping of P into an exemplary multiple parent class loader graph according to one embodiment.
Figure 12:
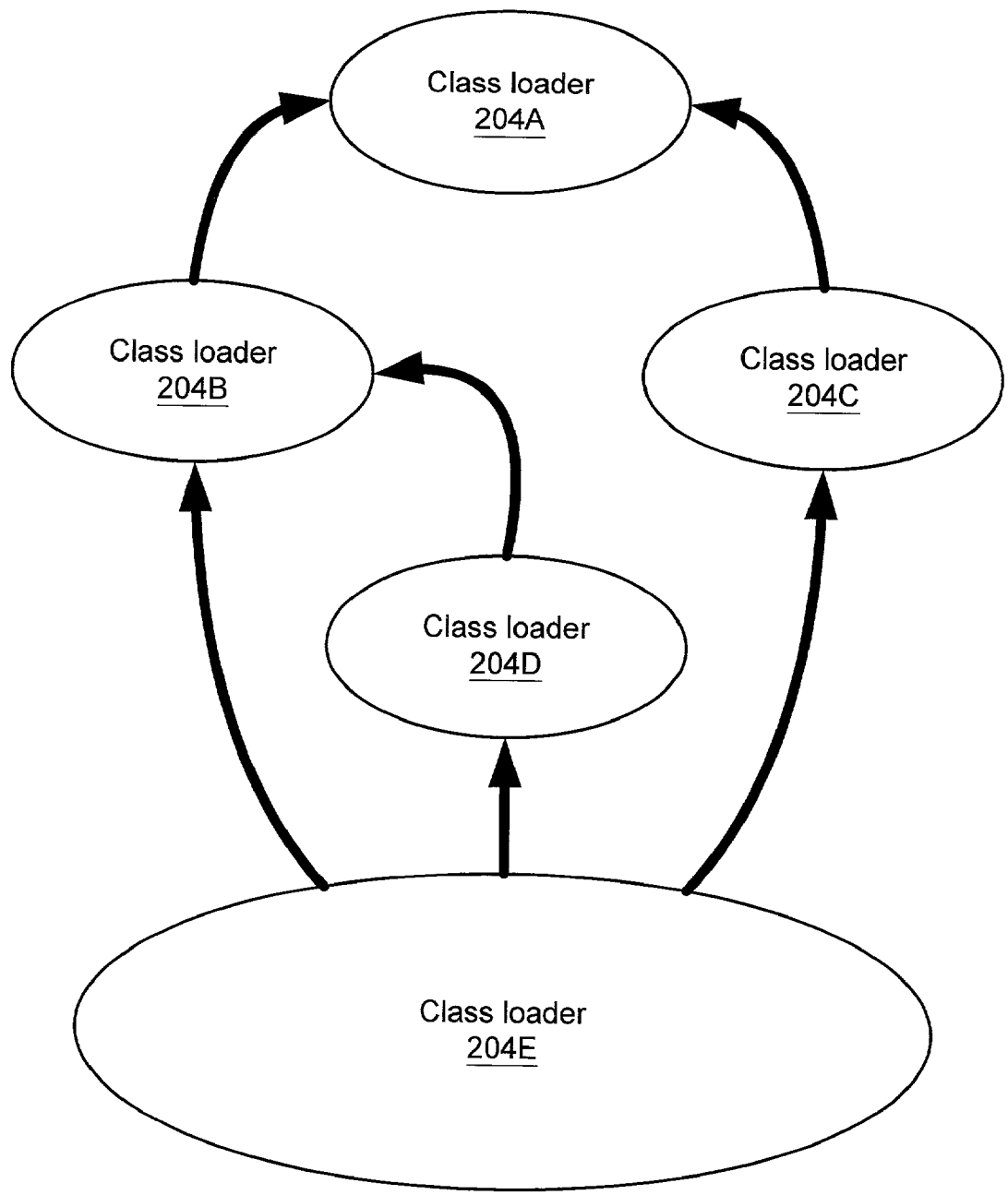
FIG. 12 illustrates a simplified version of the graph of FIG. 11 according to one embodiment.

In one embodiment, class loaders 204 may have one or more parent class loaders. In this embodiment, at least a portion of the unrelated groups 1 202 of classes 200 may be kept separate and not merged together as describe above. FIG. 11 illustrates a mapping or reduction of P into an exemplary, multiple-parent class loader graph according to one embodiment. A simplified illustration of the graph illustrated in FIG. 11 is illustrated in FIG. 12. The atomicity provided by multiple-parent class loader graphs may provide benefits in reloading classes 200. For example, if any of the classes 200 in a class loader 204 require reloading, all of the classes 200 in the class loader 204, and all of the classes 200 in all of the class loaders 204 that depend on the class loader 204 are also reloaded. Therefore, in some embodiments, it may be beneficial to make the class loaders 204 as independent of each other as possible.

It is noted that a range of embodiments between the single parent embodiment illustrated in FIG. 10 and the multiple parent embodiment illustrated in FIGS. 11 and 12 are possible and anticipated. For example, in one embodiment, one or more unrelated groups 1 202 of classes 200 may each be assigned to a different class loader 204, while others may be grouped and assigned to a single class loader.

Transitive Closure and Transitive Reduction

Mathematical expression 5) shown above describes the constraints on P1, the transitive closure of P. Possible solutions (transformations of the directed graph P) may include, but are not limited to, the transitive closure of P, where the connection distances between nodes are either 0 or 1, and the transitive reduction of P, where there are a minimum number of edges. The transitive reduction of a directed graph G is the directed graph G' with the smallest number of edges such for every path between vertices in G, G' has a path between those vertices. While the transitive closure may provide performance advantages by compromising on memory, the transitive reduction is typically more space-conscious, as there are fewer edges to maintain. The preferred solution for an application may depend on the specific application. As noted, solutions may include any of a variety of transformations of the directed graph P, including the transitive closure and reductions including the transitive reduction. In this document, the solutions that may be used are referred to as transformations of a directed graph.

Figure 13:
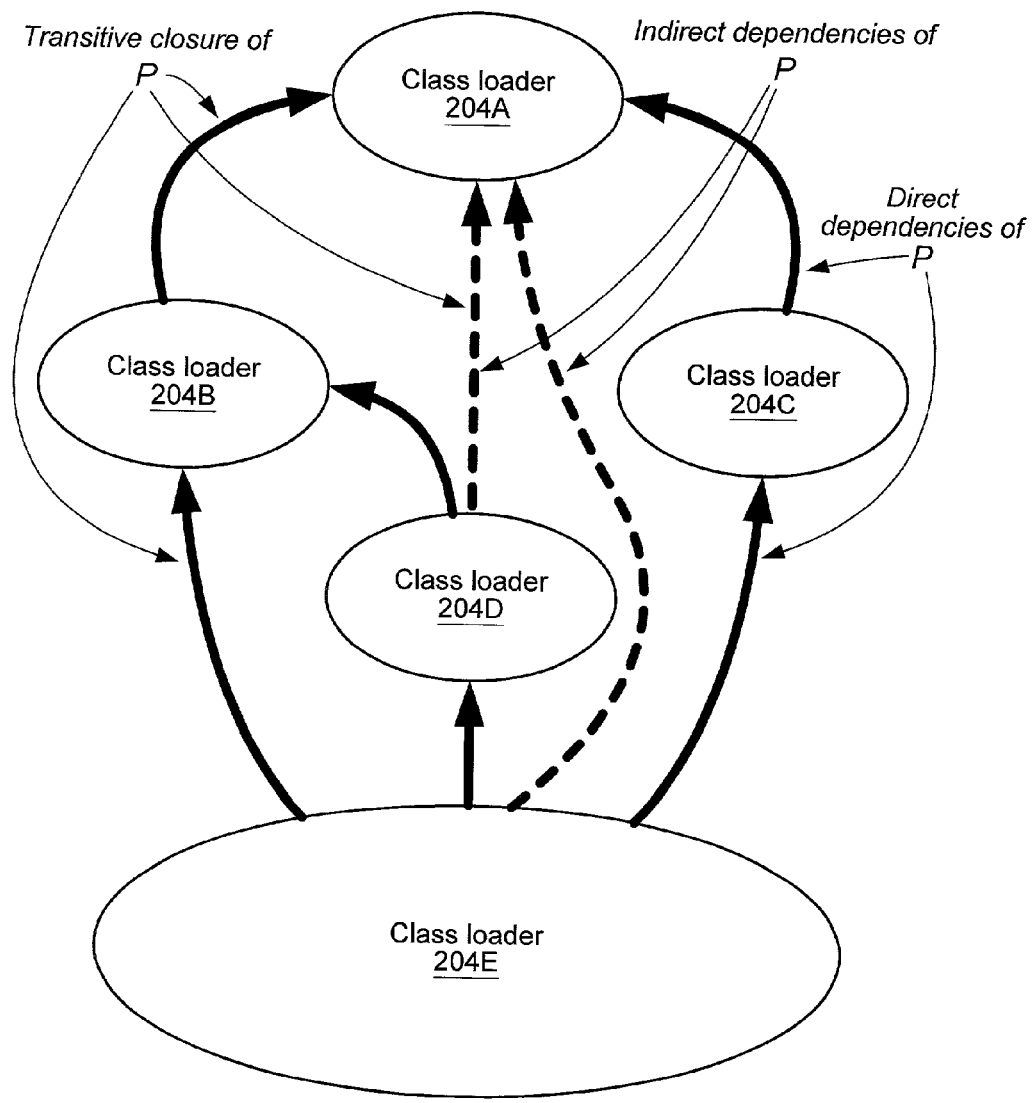
FIG. 13 illustrates the transitive closure of P and its indirect dependencies according to one embodiment.

In applications requiring performance advantages, it may be desirable to use embodiments that reduce the distances between the groups 1 202 of classes 204. In some embodiments, all the directed groups 1 202 are preferably able to directly access the groups 1 202 that they are dependent on. This may be achieved by generating a transitive closure of the graph. In some embodiments, however, memory requirements may be taken into account, as there may be too many connections for a deep hierarchy of dependencies. In one embodiment, the size of the closure may be pre-computed. To physically visualize this, consider a normalized group 1 that maintains a table of all its dependencies against the class loaders 204. With closure, 1 may maintain a hash of all the indirect dependencies as well (L was obtained from the direct dependencies). FIG. 13 illustrates the transitive closure of P and its indirect dependencies, represented by the dashed lines, according to one embodiment. If a class c1 is referring to a class c2, then it is a direct dependency. All requests for c2 automatically go to the class loader for c1. The class loader for c1 knows that the class loader for c2 is a direct dependency. Therefore, transitive closure as such does not give any additional advantages.

Figure 14:
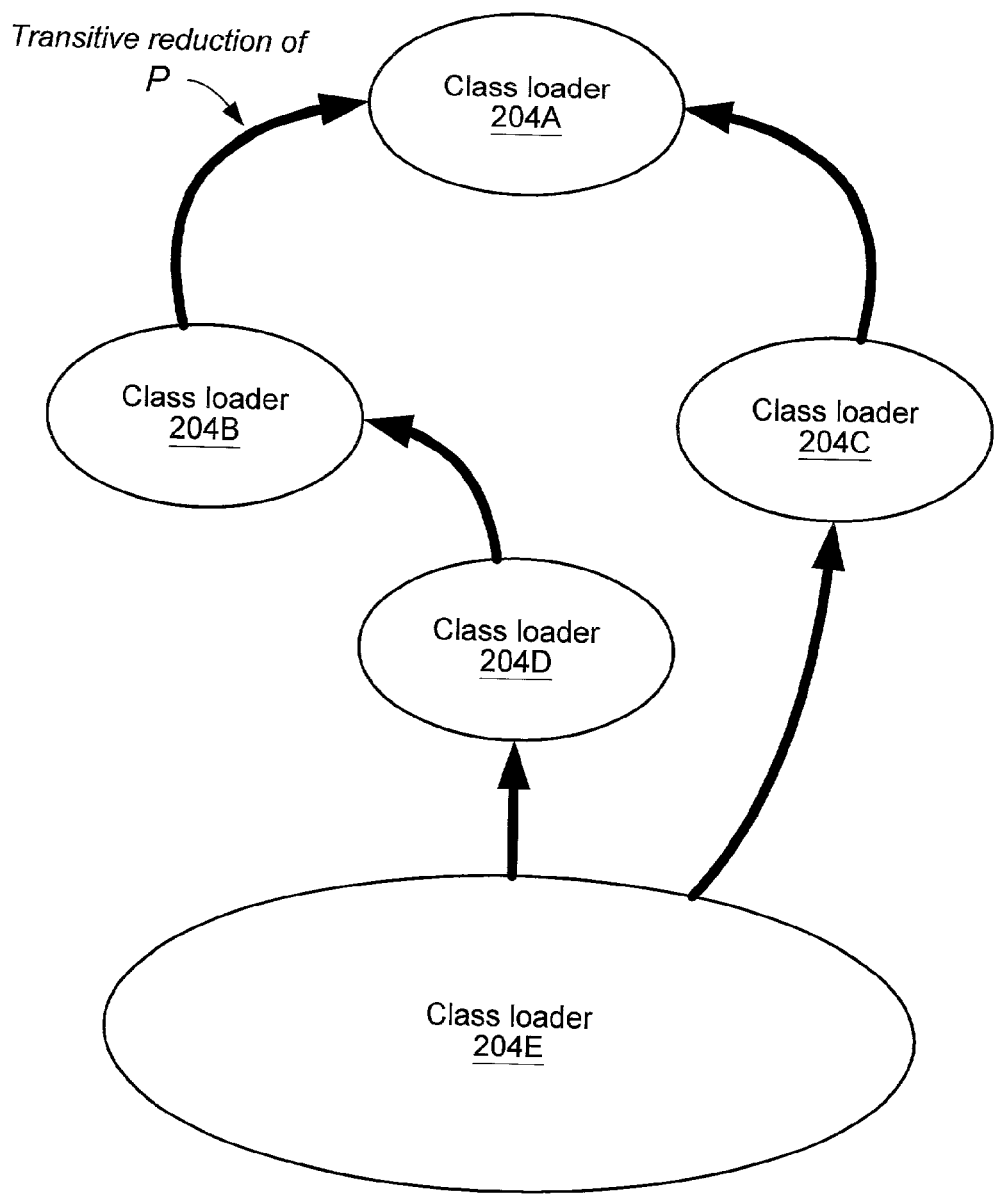
FIG. 14 illustrates the transitive reduction of P according to one embodiment.

In some embodiments, it may be desirable to use the transitive reduction to reduce the overhead of extra edges. For example, in applications constrained for heap space, the transitive reduction may be desirable. FIG. 14 illustrates the transitive reduction of P according to one embodiment. In this example, all reachable nodes remain reachable, and the extra edges are eliminated.

In one embodiment, since P is a directed acyclic graph (DAG), the transitive reduction of P may be computed by detecting cycles that have one and only one reverse edge. One skilled in the art will recognize that various algorithms are available for detecting cycles. Any of the algorithms may be used repetitively on graphs that have distinct single edges reversed, or temporarily reversed. In one embodiment, such a search may be optimized by taking each edge, and determining reachabilty (e.g. by a simple depth first search) from the head to the tail of the edge. Some embodiments may use algorithms based on simple depth first search. Other embodiments may use algorithms that are more complex. One example of a more complex algorithm that may be used is described by S. Rao Kosaraju and Gregory F. Sullivan (*Detecting cycles in dynamic graphs in polynomial time* (preliminary version). Proceedings of the Twentieth Annual ACM Symposium on Theory of Computing, pages 398–406, Chicago, Ill., 2–4, May 1988). Another example of a more complex method that may be used is described by Frank Stengel (*Detecting cycles in directed graphs*).

In another embodiment, since P is a directed acyclic graph (DAG), an edge may be temporarily deleted from the graph. A simple depth first search from beginning of the node may be performed to determine if the two points are still connected. If they are connected, then the edge may be deleted permanently, else the edge is restored to the graph. This procedure may be repeated for all the edges.

As noted, some embodiments may use transformations other than the transitive reduction and the transitive closure of the directed graph. For example, in some embodiments, an extra edge between two nodes n1 and n2 may be eliminated if and only if n1 is also reachable from n2 by a minimum of x edges, where x is a positive integer greater than 1.

Figure 15:
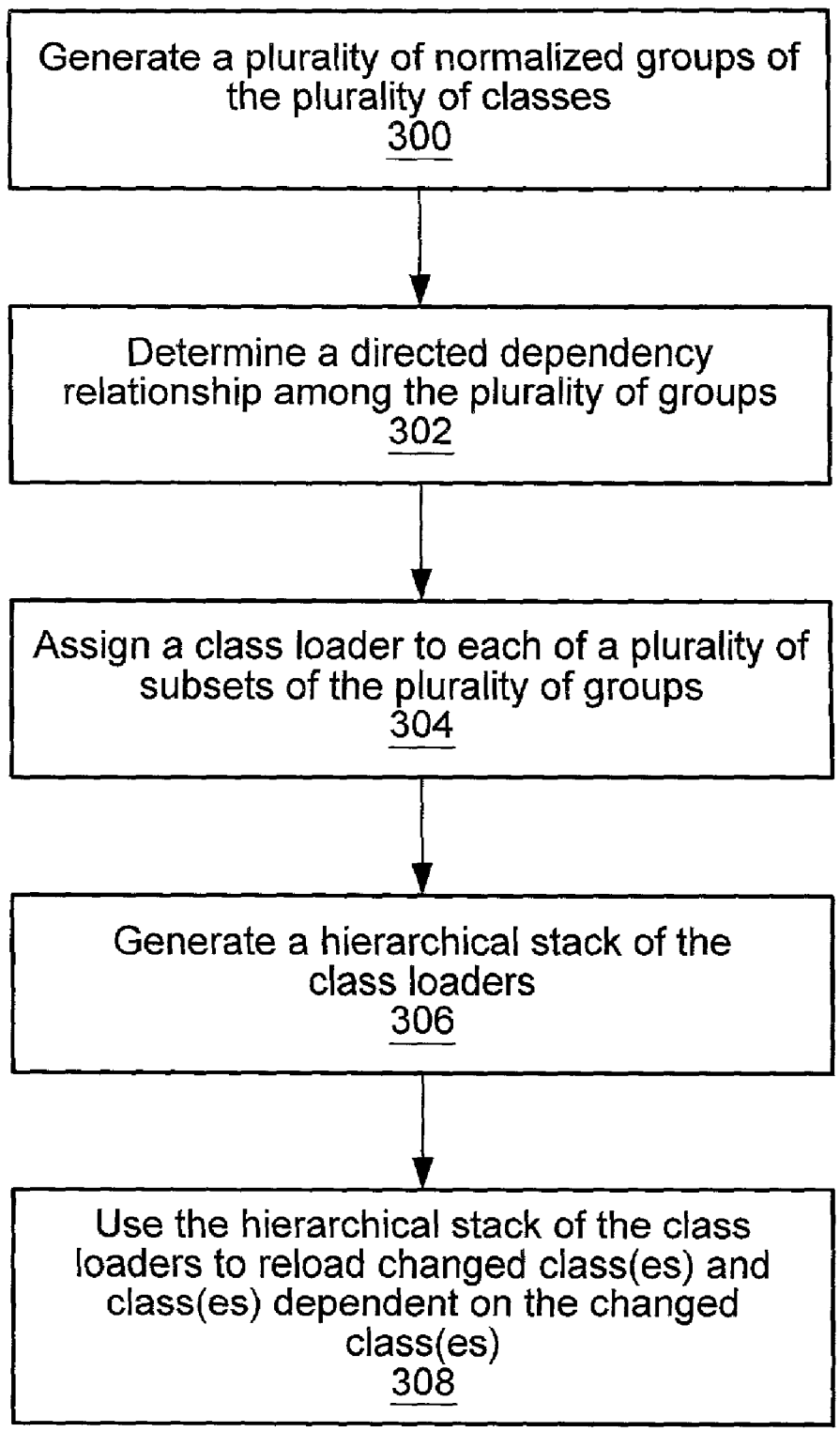
FIG. 15 is a flowchart illustrating a method for assigning classes or other programmatic logic to class loaders based on the dependency between the various classes according to one embodiment.

FIG. 15 is a flowchart illustrating a method for assigning classes or other programmatic logic such as applets to class loaders based on the dependency between the various classes for an application configured to use a plurality of classes according to one embodiment. As indicated at 300, a plurality of normalized groups of the plurality of classes is generated. Each group may include one or more classes. In one embodiment, non-interdependent classes and sets of interdependent classes among the plurality of classes are identified, and the non-interdependent classes and the sets of interdependent classes are grouped into the plurality of groups. Each group may include either a plurality of interdependent classes or one or more non-interdependent class, and each of the plurality of classes is a member class in exactly one of the plurality of groups.

As indicated at 302, a non-cyclical directed dependency relationship of the plurality of groups is determined from the relationships between one or more member classes in each of the plurality of groups and one or more member classes in one or more other groups.

As indicated at 304, a class loader is assigned to each of a plurality of subsets of the groups. Each class loader is configured to load the one or more classes in its associated subset of the groups. The plurality of subsets of the groups may be determined from the directed dependency relationship of the plurality of groups. In one embodiment, for each group that is dependent on only one other group, the one other group is assigned to a subset including the one other group. A class loader assigned to the subset including the one other group is a parent in the hierarchical stack of the class loaders of a class loader assigned to the particular group that is dependent on the one other group. For each group that is dependent on two or more other groups, the two or more other groups are assigned to a subset including the two or more other groups. A class loader assigned to the subset including the two or more other groups is a parent in the hierarchical stack of the class loaders of a class loader assigned to the particular group that is dependent on the two or more groups.

As indicated at 306, a hierarchical stack of the class loaders is generated. The hierarchical stack of class loaders is configured for use by the application in reloading changed classes during execution of the application. In one embodiment, a hierarchical relationship of the plurality of class loaders is determined from a dependency relationship of the plurality of subsets of the groups, and the hierarchical stack of class loaders is generated from the hierarchical relationship of the plurality of class loaders. In one embodiment, a transformation of the hierarchical relationship may be performed in generating the hierarchical stack of class loaders. In one embodiment, the transformation may generate a transitive closure of the hierarchical relationship of the plurality of class loaders, and the hierarchical stack of class loaders is generated from the transitive closure. In one embodiment, the transformation may generate a reduction of the hierarchical relationship of the plurality of class loaders, and the hierarchical stack of class loaders is generated from the reduction of the hierarchical relationship of the class loaders. In one embodiment, the transformation may generate a transitive reduction of the hierarchical relationship of the class loaders. The transitive reduction of a directed graph G is the directed graph G' with the smallest number of edges such for every path between vertices in G, G' has a path (direct or indirect) between those vertices.

Some embodiments may use transformations other than the transitive reduction and the transitive closure of the directed graph. For example, in some embodiments, an extra edge between two nodes n1 and n2 may be eliminated if and only if n1 is also reachable from n2 by a minimum of x edges, where x is a positive integer greater than 1.

In one embodiment, each class loader in the hierarchical stack of class loaders has at most one parent class loader in the hierarchical stack of class loaders. In another embodiment, one or more of the class loaders in the hierarchical stack of class loaders each may have a plurality of parent class loaders in the hierarchical stack of class loaders.

As indicated at 308, the hierarchical stack of class loaders may then be used in reloading changed class(es) and classed dependent on the changed class(es). Embodiments may be used to organize class loaders for the dynamically reloadable components in the hierarchical stack of class loaders based on the dependency between the various classes, and not necessarily on details such as the platform-specific roles (e.g. servlet, bean, helper, etc.) the classes may play. Using embodiments of the hierarchical stack of class loaders, changed classes may be detected, a class loader for the changed class may be located in the hierarchical stack and replaced, if necessary, and only the changed class and its dependent classes may be reloaded. This may help to limit the number of files that are affected (e.g. the number of class loaders that have to be replaced and/or the number of classes that have to be reloaded) on the application server when a class is changed.

It is noted that FIG. 15 represents exemplary embodiments of methods for assigning classes or other programmatic logic such as applets to class loaders based on the dependency between the various classes. The method may be implemented in software, hardware, or a combination thereof. The order of method may be changed, and various elements may be added, reordered, combined, omitted, modified, etc. In some embodiments, the method may be implemented as an automated process, with a set of classes as an input and the hierarchical stack of class loaders as the output. In other embodiments, the method may be implemented as a user-controlled process, for example by providing a graphical user interface (GUI) to allow the user, through input to the GUI, to specify the classes, the dependencies among the classes, and perform or control the various functions to generate the hierarchical stack of class loaders. Some embodiments may combine user-controlled and automated processes, thus allowing the automated processes to be controlled by the user through input to a GUI, and allowing the user to modify results of various automated functions.

CONCLUSION

The class dependency graph-based class loading and reloading mechanism provides a domain-independent, flexible and robust namespace segregation technique that is that is based on the dependency between the various classes and not on details like the roles the classes play.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or nonvolatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

In summary, a system and method for providing class dependency graph-based class loading and reloading have been disclosed. It will be appreciated by those of ordinary skill having the benefit of this disclosure that the illustrative embodiments described above are capable of numerous variations without departing from the scope and spirit of the invention. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A system comprising:
a processor;
a memory configured to store program instructions, wherein the program instructions implement an application executable by the processor;
wherein the application comprises a plurality of classes, wherein the plurality of classes comprises one or more non-interdependent classes and at least one set of two or more interdependent classes;

wherein the application further comprises a hierarchical stack of class loaders each configured to load one or more of the plurality of classes in the application, wherein each class of the plurality of classes is loadable by exactly one of the class loaders, and wherein said hierarchical stack of class loaders comprises:

a separate class loader for each set of two or more interdependent classes; and a separate class loader for each of one or more groups of non-interdependent classes, wherein each group comprises at least one of the one or more non-interdependent classes;

wherein, during execution of the application, the program instructions are executable by the processor to:

detect that one of the plurality of classes has been changed; and replace a current class loader in the hierarchical stack of class loaders that is configured to load one or more of the plurality of classes including the class that has been changed with a new class loader that is configured to load the one or more of the plurality of classes including the changed class; and wherein the new class loader is configured to load the one or more of the plurality of classes including the changed class in the application during execution of the application.

2. The system as recited in claim 1, wherein, during execution of the application, the program instructions are further executable to replace one or more other class loaders in the hierarchical stack of class loaders, wherein the one or more other class loaders are each configured to load one or more others of the plurality of classes including at least one class with dependencies on the changed class.

3. The system as recited in claim 1, wherein the application is one of one or more applications executing within an application server that provides a platform-independent, object-oriented application environment.

4. The system as recited in claim 1, wherein the program instructions further implement one or more other applications executable by the processor;

wherein each of the one or more other applications comprises a plurality of classes for the particular application, wherein the plurality of classes for each of the one or more other applications comprises one or more non-interdependent classes and at least one set of two or more interdependent classes;

wherein each of the one or more other applications further comprises a hierarchical stack of class loaders for the particular application, wherein each class loader in the hierarchical stack of class loaders for the particular application is configured to load one or more of the plurality of classes for the particular application, wherein each class of the plurality of classes for the particular application is loadable by exactly one of the class loaders for the particular application, and wherein the hierarchical stack of class loaders for the particular application comprises:

a separate class loader for each set of two or more interdependent classes of the particular application; and a separate class loader for each of one or more groups of non-interdependent classes of the particular application, wherein each group comprises at least one of the one or more non-interdependent classes; and wherein each class loader in the hierarchical stack of class loaders for the particular application is configured to load one or more of the plurality of classes for the particular application during execution of the particular application.

5. The system as recited in claim 1, wherein the program instructions are further executable to generate the hierarchical stack of class loaders.

6. The system as recited in claim 5, wherein, to generate the hierarchical stack of class loaders, the program instructions are further executable to:

generate a plurality of normalized class groups of the plurality of classes, wherein each normalized class group comprises one or more of the plurality of classes as member classes in the normalized class group;

determine a directed dependency relationship of the plurality of normalized class groups in accordance with relationships of one or more member classes in each of the plurality of normalized class groups with one or more member classes in one or more others of the plurality of normalized class groups, wherein the directed dependency relationship of the plurality of normalized class groups is non-cyclical; and for a plurality of subsets of the plurality of normalized class groups, assign a class loader to each subset, wherein each class loader assigned to a subset of the plurality of normalized class groups is configured to load the one or more classes in its associated subset of the plurality of normalized class groups.

7. The system as recited in claim 6, wherein, to generate a plurality of normalized class groups of the plurality of classes, the program instructions are further executable to:

identify the one or more non-interdependent classes and the at least one set of two or more interdependent classes of the plurality of classes of the application; and group the one or more non-interdependent classes and the at least one set of two or more interdependent classes into the plurality of normalized class groups, wherein each normalized class group comprises either one or more of the sets from the at least one set of two or more interdependent classes or one or more of the one or more non-interdependent classes, and wherein each class of the plurality of classes is a member in exactly one of the plurality of normalized class groups.

8. The system as recited in claim 6, wherein the program instructions are further executable to:

for each normalized class group that is dependent on only one other normalized class group, assign the one other normalized class group to a subset of the normalized class groups comprising at least the one other normalized class group, and wherein, in the hierarchical stack of class loaders, a class loader assigned to the subset of the normalized class groups comprising the one other normalized class group is a parent of a class loader assigned to the normalized class group that is dependent on the one other normalized class group; and for each normalized class group that is dependent on two or more other normalized class groups, assign the two or more other normalized class groups to a subset of the normalized class groups comprising at least the two or more other normalized class groups, and wherein, in the hierarchical stack of class loaders, a class loader assigned to the subset of the normalized class groups comprising the two or more other normalized class groups is a parent of a class loader assigned to the normalized class group that is dependent on the two or more other normalized class groups.

9. The system as recited in claim 6, wherein, to generate the hierarchical stack of class loaders, the program instructions are further executable to:
  determine a hierarchical relationship of the class loaders in accordance with a dependency relationship of the plurality of subsets of the plurality of normalized class groups; and
  generate the hierarchical stack of class loaders in accordance with the determined hierarchical relationship of the class loaders.

10. The system as recited in claim 6, wherein, to generate the hierarchical stack of class loaders, the program instructions are further executable to:
  determine a hierarchical relationship of the class loaders in accordance with a dependency relationship of the plurality of subsets of the plurality of normalized class groups;
  generate a transformation of the determined hierarchical relationship of the class loaders; and
  generate the hierarchical stack of class loaders in accordance with the generated transformation of the determined hierarchical relationship of the class loaders.

11. The system as recited in claim 6, wherein, to generate the hierarchical stack of class loaders, the program instructions are further executable to:
  determine a hierarchical relationship of the class loaders in accordance with a dependency relationship of the plurality of subsets of the plurality of normalized class groups;
  generate a transitive closure of the determined hierarchical relationship of the class loaders; and
  generate the hierarchical stack of class loaders in accordance with the generated transitive closure of the determined hierarchical relationship of the class loaders.

12. The system as recited in claim 6, wherein, to generate the hierarchical stack of class loaders, the program instructions are further executable to:
  determine a hierarchical relationship of the class loaders in accordance with a dependency relationship of the plurality of subsets of the plurality of normalized class groups;
  generate a transitive reduction of the determined hierarchical relationship of the class loaders; and
  generate the hierarchical stack of class loaders in accordance with the generated transitive reduction of the determined hierarchical relationship of the class loaders.

13. The system as recited in claim 1, wherein each class loader in the hierarchical stack of class loaders has at most one parent class loader in the hierarchical stack of class loaders.

14. The system as recited in claim 1, wherein one or more of the class loaders in the hierarchical stack of class loaders each has two or more parent class loaders in the hierarchical stack of class loaders.

15. A system comprising:
  a processor; and
  a memory configured to store program instructions, wherein the program instructions implement an application executable by the processor, and wherein the program instructions are executable by the processor to:
    generate a plurality of normalized class groups, wherein each of the plurality of normalized class groups comprises one or more of a plurality of classes used by the application as member classes in the normalized class group, and wherein each class of the plurality of classes is a member class in exactly one of the plurality of normalized class groups;
    determine a non-cyclical directed dependency relationship of the plurality of normalized class groups in accordance with relationships of one or more member classes in each of the plurality of normalized class groups with one or more member classes in one or more others of the plurality of normalized class groups;
    for a plurality of subsets of the plurality of normalized class groups, assign a class loader to each subset of the plurality of normalized class groups, wherein each class loader assigned to a subset of the plurality of normalized class groups is configured to load the one or more classes in its associated subset of the plurality of normalized class groups; and
    generate a hierarchical stack of class loaders comprising the class loaders assigned to the plurality of subsets of the plurality of normalized class groups, wherein the hierarchical stack of class loaders is configured for use in loading changed member classes of the plurality of normalized class groups during execution of the application.

16. The system as recited in claim 15, wherein, to generate a plurality of normalized class groups, the program instructions are further executable to:
  identify one or more non-interdependent classes and at least one set of two or more interdependent classes among the plurality of classes; and
  group the one or more non-interdependent classes and the at least one set of two or more interdependent classes into the plurality of normalized class groups, wherein each normalized class group comprises either one or more of the sets from the at least one set of two or more interdependent classes or one or more of the one or more non-interdependent classes, and wherein each of the plurality of classes is a member class in exactly one of the plurality of normalized class groups.

17. The system as recited in claim 15, wherein the program instructions are further executable to:
  for each normalized class group that is dependent on only one other normalized class group, assign the one other normalized class group to a subset of the normalized class groups comprising at least the one other normalized class group, and wherein, in the hierarchical stack of class loaders, a class loader assigned to the subset of the normalized class groups comprising the one other normalized class group is a parent of a class loader assigned to the normalized class group that is dependent on the one other normalized class group; and
  for each normalized class group that is dependent on two or more other normalized class groups, assign the two or more other normalized class groups to a subset of the normalized class groups comprising at least the two or more other normalized class groups, and wherein, in the hierarchical stack of class loaders, a class loader assigned to the subset of the normalized class groups comprising the two or more other normalized class groups is a parent of a class loader assigned to the normalized class group that is dependent on the two or more other normalized class groups.

18. The system as recited in claim 15, wherein, to generate a hierarchical stack of class loaders, the program instructions are further executable to:

determine a hierarchical relationship of the class loaders in accordance with a dependency relationship of the plurality of subsets of the plurality of normalized class groups; and generate the hierarchical stack of class loaders in accordance with the determined hierarchical relationship of the class loaders.

19. The system as recited in claim 15, wherein, to generate a hierarchical stack of class loaders, the program instructions are further executable to:

determine a hierarchical relationship of the class loaders in accordance with a dependency relationship of the plurality of subsets of the plurality of normalized class groups;

generate a transformation of the determined hierarchical relationship of the class loaders; and generate the hierarchical stack of class loaders in accordance with the generated transformation of the determined hierarchical relationship of the class loaders.

20. The system as recited in claim 15, wherein, to generate a hierarchical stack of class loaders, the program instructions are further executable to:

determine a hierarchical relationship of the class loaders in accordance with a dependency relationship of the plurality of subsets of the plurality of normalized class groups;

generate a transitive closure of the determined hierarchical relationship of the class loaders; and generate the hierarchical stack of class loaders in accordance with the generated transitive closure of the determined hierarchical relationship of the class loaders.

21. The system as recited in claim 15, wherein, to generate a hierarchical stack of class loaders, the program instructions are further executable to:

determine a hierarchical relationship of the class loaders in accordance with a dependency relationship of the plurality of subsets of the plurality of normalized class groups;

generate a transitive reduction of the determined hierarchical relationship of the class loaders; and generate the hierarchical stack of class loaders in accordance with the generated transitive reduction of the determined hierarchical relationship of the class loaders.

22. The system as recited in claim 15, wherein each class loader in the hierarchical stack of class loaders has at most one parent class loader in the hierarchical stack of class loaders.

23. The system as recited in claim 15, wherein one or more of the class loaders in the hierarchical stack of class loaders each has two or more parent class loaders in the hierarchical stack of class loaders.

24. The system as recited in claim 15, wherein each of the class loaders in the hierarchical stack of class loaders is executable by the processor to load the one or more classes in its associated subset of the plurality of normalized class groups in the application, and wherein the program instructions are further executable to:

detect that one of the plurality of classes used by the application has been changed while the application is executing; and in response to said detecting, replace a class loader in the hierarchical stack of class loaders with a new class loader, wherein the replaced class loader is configured to load member classes of a subset of the plurality of normalized class groups comprising a normalized class group that includes the class that has been changed as a member class, and wherein the new class loader is configured to load the member classes of the subset of the plurality of normalized class groups comprising the normalized class group that includes the changed class as a member class.

25. The system as recited in claim 24, wherein the new class loader is executable by the processor to load the member classes of its associated subset of the plurality of normalized class groups including the normalized class group that includes the changed class as a member class while the application is executing.

26. The system as recited in claim 24, wherein the program instructions are further executable to load the changed class and one or more others of the plurality of classes with dependencies on the changed class while the application is executing.

27. The system as recited in claim 24, wherein the program instructions are further executable to determine one or more other class loaders configured to load associated subsets of the plurality of normalized class groups comprising normalized class groups that include one or more classes with dependencies on the changed class as member classes, wherein the one or more other class loaders are each executable by the processor to load member classes of an associated subset of the plurality of normalized class groups comprising the normalized class groups that include the one or more classes with dependencies on the changed class as member classes during execution of the application.

28. The system as recited in claim 24, wherein the program instructions are further executable to replace one or more other class loaders configured to load associated subsets of the plurality of normalized class groups comprising normalized class groups that include one or more classes with dependencies on the changed class in the hierarchical stack of class loaders.

29. The system as recited in claim 15, wherein the application is one of a plurality of applications executing within an application server, wherein, for each of the plurality of applications, the program instructions are further executable by the processor to:

generate a plurality of normalized class groups, wherein each of the plurality of normalized class groups comprises one or more of a plurality of classes used by the particular application as member classes in the normalized class group, and wherein each class of the plurality of classes is a member class in exactly one of the plurality of normalized class groups;

determine a directed dependency relationship of the plurality of normalized class groups in accordance with relationships of one or more member classes in each of the plurality of normalized class groups with one or more member classes in one or more others of the plurality of normalized class groups, wherein the directed dependency relationship is non-cyclical;

for a plurality of subsets of the plurality of normalized class groups, assign a class loader to each subset of the plurality of normalized class groups, wherein each class loader assigned to a subset of the plurality of normalized class groups is configured to load the one or more classes in its associated subset of the plurality of normalized class groups; and generate a hierarchical stack of class loaders for the particular application, wherein the hierarchical stack of class loaders comprises the class loaders assigned to the plurality of subsets of the plurality of normalized class groups, and wherein the hierarchical stack of class loaders is configured for use in loading changed member classes of the plurality of normalized class groups during execution of the particular application.

30. The system as recited in claim 15, wherein the application is one of one or more applications executing within an application server that provides a platform-independent, object-oriented application environment.

31. A system comprising:
a processor; and
a memory configured to store program instructions, wherein the program instructions implement an application executable by the processor, and wherein the program instructions are executable by the processor to:
generate a plurality of normalized class groups, wherein each of the plurality of normalized class groups comprises one or more of a plurality of classes used by the application as member classes in the normalized class group, and wherein each class of the plurality of classes is a member class in exactly one of the plurality of normalized class groups;
determine a non-cyclical directed dependency relationship of the plurality of normalized class groups in accordance with relationships of one or more member classes in each of the plurality of normalized class groups with one or more member classes in one or more others of the plurality of normalized class groups;
determine a hierarchical dependency relationship of a plurality of subsets of the plurality of normalized class groups, wherein each subset comprises one or more of the plurality of normalized class groups;
assign a separate class loader to each of the plurality of subsets of the plurality of normalized class groups, wherein each class loader is configured to load member classes of normalized class groups in its associated subset of the plurality of normalized class groups;
determine a hierarchical relationship of the class loaders assigned to each of the plurality of subsets of the plurality of normalized class groups, wherein the hierarchical relationship of the class loaders is determined in accordance with the hierarchical dependency relationship of the plurality of subsets of the plurality of normalized class groups;
generate a transformation of the hierarchical relationship of the class loaders; and
generate a hierarchical stack of the class loaders in accordance with the generated transformation of the hierarchical relationship of the class loaders, wherein the hierarchical stack of the class loaders is configured for use in loading changed classes during execution of the application.

32. The system as recited in claim 31, wherein the transformation is a transitive closure of the hierarchical relationship of the class loaders.

33. The system as recited in claim 31, wherein the transformation is a transitive reduction of the hierarchical relationship of the class loaders.

34. The system as recited in claim 31, wherein, to generate a plurality of normalized class groups, the program instructions are further executable to:
identify one or more non-interdependent classes and at least one set of two or more interdependent classes among the plurality of classes; and
group the one or more non-interdependent classes and the at least one set of two or more interdependent classes into the plurality of normalized class groups, wherein each normalized class group comprises either one or more of the sets from the at least one set of two or more interdependent classes or one or more of the one or more non-interdependent classes, and wherein each of the plurality of classes is a member class in exactly one of the plurality of normalized class groups.

35. The system as recited in claim 31, wherein the program instructions are further executable to:
for each normalized class group that is dependent on only one other normalized class group, assign the one other normalized class group to a subset of the normalized class groups comprising at least the one other normalized class group, and wherein, in the hierarchical stack of class loaders, a class loader assigned to the subset of the normalized class groups comprising the one other normalized class group is a parent of a class loader assigned to the normalized class group that is dependent on the one other normalized class group;
for each normalized class group that is dependent on two or more other normalized class groups, assign the two or more other normalized class groups to a subset of the normalized class groups comprising at least the two or more other normalized class groups, and wherein, in the hierarchical stack of class loaders, a class loader assigned to the subset of the normalized class groups comprising the two or more other normalized class groups is a parent of a class loader assigned to the normalized class group that is dependent on the two or more other normalized class groups.

36. The system as recited in claim 31, wherein each of the class loaders in the hierarchical stack of class loaders is executable by the processor to load the one or more classes in its associated subset of the plurality of normalized class groups in the application, and wherein the program instructions are further executable to:
detect that one of the plurality of classes used by the application has been changed while the application is executing; and
in response to said detecting, replace a class loader in the hierarchical stack of class loaders with a new class loader, wherein the replaced class loader is configured to load member classes of a subset of the plurality of normalized class groups comprising a normalized class group that includes the class that has been changed as a member class, and wherein the new class loader is configured to load the member classes of the subset of the plurality of normalized class groups comprising the normalized class group that includes the changed class as a member class;
wherein the new class loader is executable by the processor to load the member classes of its associated subset of the plurality of normalized class groups including the normalized class group that includes the changed class as a member class while the application is executing.

37. The system as recited in claim 36, wherein the program instructions are further executable to determine one or more other class loaders configured to load associated subsets of the plurality of normalized class groups comprising one or more normalized class groups that include one or more classes with dependencies on the changed class as member classes, wherein each of the one or more other class loaders is executable by the processor to load member classes of its associated subset of the plurality of normalized class groups during execution of the application.

38. A computer-implemented method for dynamically reloading classes in an application, the method comprising:

detecting that a class used by the application has been changed;

wherein the application is configured to use a plurality of classes including the class that has been changed, wherein the plurality of classes comprises one or more non-interdependent classes and at least one set of two or more interdependent classes;

wherein the application further comprises a hierarchical stack of class loaders each configured to load one or more of the plurality of classes in the application, wherein each class of the plurality of classes is loadable by exactly one of the class loaders, and wherein said hierarchical stack of class loaders comprises:

a separate class loader for each set of two or more interdependent classes; and a separate class loader for each of one or more groups of the non-interdependent classes, wherein each group comprises at least one of the one or more non-interdependent classes;

in response to said detecting that a class used by the application has been changed, replacing one of the class loaders in the hierarchical stack of class loaders that is configured to load one or more of the plurality of classes including the class that has been changed with a new class loader that is configured to load the one or more of the plurality of classes including the changed class; and the new class loader loading the the one or more of the plurality of classes including the changed class in the application during execution of the application.

39. The computer-implemented method as recited in claim 38, further comprising:

in response to said detecting that a class used by the application has been changed, replacing one or more other class loaders in the hierarchical stack of class loaders, wherein each of the one or more other class loaders is configured to load a different one or more of the plurality of classes including one or more classes with dependencies on the changed class; and each of the one or more other class loaders loading the different one or more of the plurality of classes including the one or more classes with dependencies on the changed class during execution of the application.

40. The computer-implemented method as recited in claim 38, wherein the application is one of one or more applications executing within an application server, wherein the application server provides a platform-independent, object-oriented application environment.

41. The computer-implemented method as recited in claim 38, wherein the application is executing within an application server, wherein one or more other applications are executing within the application server;

wherein each of the one or more other applications comprises a plurality of classes for the particular application, wherein the plurality of classes for each of the one or more other applications comprises one or more non-interdependent classes and at least one set of two or more interdependent classes;

wherein each of the one or more other applications further comprises a hierarchical stack of class loaders for the particular application, wherein each class loader in the hierarchical stack of class loaders for the particular application is configured to load one or more of the plurality of classes for the particular application, wherein each class of the plurality of classes for the particular application is loadable by exactly one of the class loaders for the particular application, and wherein the hierarchical stack of class loaders for the particular application comprises:

a separate class loader for each set of two or more interdependent classes of the particular application; and a separate class loader for each of one or more groups of non-interdependent classes of the particular application, wherein each group comprises at least one of the one or more non-interdependent classes; and wherein each class loader in the hierarchical stack of class loaders for the particular application is configured to load one or more of the plurality of classes for the particular application during execution of the particular application.

42. The computer-implemented method as recited in claim 38, further comprising generating the hierarchical stack of class loaders, wherein said generating the hierarchical stack of class loaders comprises:

generating a plurality of normalized class groups of the plurality of classes, wherein each normalized class group comprises one or more of the plurality of classes as member classes in the normalized class group;

determining a directed dependency relationship of the plurality of normalized class groups in accordance with relationships of one or more member classes in each of the plurality of normalized class groups with one or more member classes in one or more others of the plurality of normalized class groups, wherein the directed dependency relationship of the plurality of normalized class groups is non-cyclical; and for a plurality of subsets of the plurality of normalized class groups, assigning a class loader to each subset, wherein each class loader assigned to a subset of the plurality of normalized class groups is configured to load the one or more classes in its associated subset of the plurality of normalized class groups.

43. The computer-implemented method as recited in claim 42, wherein said generating a plurality of normalized class groups of the plurality of classes further comprises:

identifying the one or more non-interdependent classes and the at least one set of two or more interdependent classes of the plurality of classes of the application; and grouping the one or more non-interdependent classes and the at least one set of two or more interdependent classes into the plurality normalized of class groups, wherein each normalized class group comprises either one or more of the sets from the at least one set of two or more interdependent classes or one or more of the one or more non-interdependent classes, and wherein each class of the plurality of classes is a member in exactly one of the plurality of normalized class groups.

44. The computer-implemented method as recited in claim 42, further comprising:

for each normalized class group that is dependent on only one other normalized class group, assigning the one other normalized class group to a subset of the normalized class groups comprising at least the one other normalized class group, and wherein, in the hierarchical stack of class loaders, a class loader assigned to the subset of the normalized class groups comprising the one other normalized class group is a parent of a class loader assigned to the normalized class group that is dependent on the one other normalized class group; and for each normalized class group that is dependent on two or more other normalized class groups, assigning the two or more other normalized class groups to a subset of the normalized class groups comprising at least the two or more other class groups, and wherein, in the hierarchical stack of class loaders, a class loader assigned to the subset of the normalized class groups comprising the two or more other normalized class groups is a parent of a class loader assigned to the normalized class group that is dependent on the two or more other normalized class groups.

45. The computer-implemented method as recited in claim 42, wherein said generating the hierarchical stack of class loaders further comprises:
   determining a hierarchical relationship of the class loaders in accordance with a dependency relationship of the plurality of subsets of the plurality of normalized class groups; and
   generating the hierarchical stack of class loaders in accordance with the determined hierarchical relationship of the class loaders.

46. The computer-implemented method as recited in claim 42, wherein said generating the hierarchical stack of class loaders comprises:
   determining a hierarchical relationship of the class loaders in accordance with a dependency relationship of the plurality of subsets of the plurality of normalized class groups;
   generating a transformation of the determined hierarchical relationship of the class loaders; and
   generating the hierarchical stack of class loaders in accordance with the generated transformation of the determined hierarchical relationship of the class loaders.

47. The computer-implemented method as recited in claim 42, wherein said generating the hierarchical stack of class loaders comprises:
   determining a hierarchical relationship of the class loaders in accordance with a dependency relationship of the plurality of subsets of the plurality of normalized class groups;
   generating a transitive closure of the determined hierarchical relationship of the class loaders; and
   generating the hierarchical stack of class loaders in accordance with the generated transitive closure of the determined hierarchical relationship of the class loaders.

48. The computer-implemented method as recited in claim 42, wherein said generating the hierarchical stack of class loaders further comprises:
   determining a hierarchical relationship of the class loaders in accordance with a dependency relationship of the plurality of subsets of the plurality of normalized class groups;
   generating a transitive reduction of the determined hierarchical relationship of the class loaders; and
   generating the hierarchical stack of class loaders in accordance with the generated transitive reduction of the determined hierarchical relationship of the class loaders.

49. The computer-implemented method as recited in claim 38, wherein each class loader in the hierarchical stack of class loaders has at most one parent class loader in the hierarchical stack of class loaders.

50. The computer-implemented method as recited in claim 38, wherein one or more of the class loaders in the hierarchical stack of class loaders each has two or more parent class loaders in the hierarchical stack of class loaders.

51. A computer-implemented method for assigning classes to class loaders for an application, the method comprising:
   generating a plurality of normalized class groups, wherein each of the plurality of normalized class groups comprises one or more of a plurality of classes used by the application as member classes in the normalized class group, and wherein each class of the plurality of classes is a member class in exactly one of the plurality of normalized class groups;
   determining a directed dependency relationship of the plurality of normalized class groups in accordance with relationships of one or more member classes in each of the plurality of normalized class groups with one or more member classes in one or more others of the plurality of normalized class groups, wherein the directed dependency relationship is non-cyclical;
   for a plurality of subsets of the plurality of normalized class groups, assigning a class loader to each subset of the plurality of normalized class groups, wherein each class loader assigned to a subset of the plurality of normalized class groups is configured to load the one or more member classes in its associated subset of the plurality of normalized class groups; and
   generating a hierarchical stack of class loaders comprising the class loaders assigned to the plurality of subsets of the plurality of normalized class groups, wherein the hierarchical stack of class loaders is configured for use in loading changed member classes of the plurality of normalized class groups during execution of the application.

52. The computer-implemented method as recited in claim 51, wherein said generating a plurality of normalized class groups comprises:
   identifying one or more non-interdependent classes and at least one set of two or more interdependent classes among the plurality of classes; and
   grouping the one or more non-interdependent classes and the at least one set of two or more interdependent classes into the plurality of normalized class groups, wherein each normalized class group comprises either one or more of the sets from the at least one set of two or more interdependent classes or one or more of the one or more non-interdependent classes, and wherein each of the plurality of classes is a member in exactly one of the plurality of normalized class groups.

53. The computer-implemented method as recited in claim 51, further comprising:
   for each normalized class group that is dependent on only one other normalized class group, assigning the one other normalized class group to a subset of the normalized class groups comprising at least the one other normalized class group, and wherein, in the hierarchical stack of class loaders, a class loader assigned to the subset of the normalized class groups comprising the one other normalized class group is a parent of a class loader assigned to the normalized class group that is dependent on the one other normalized class group; and
   for each normalized class group that is dependent on two or more other normalized class groups, assigning the two or more other normalized class groups to a subset of the normalized class groups comprising at least the two or more other normalized class groups, and wherein, in the hierarchical stack of class loaders, a class loader assigned to the subset of the normalized class groups comprising the two or more other normalized class groups is a parent of a class loader assigned to the normalized class group that is dependent on the two or more other normalized class groups.

54. The computer-implemented method as recited in claim 51, wherein said generating a hierarchical stack of class loaders comprises:
   determining a hierarchical relationship of the class loaders in accordance with a dependency relationship of the plurality of subsets of the plurality of normalized class groups; and
   generating the hierarchical stack of class loaders in accordance with the determined hierarchical relationship of the class loaders.

55. The computer-implemented method as recited in claim 51, wherein said generating a hierarchical stack of class loaders comprises:
   determining a hierarchical relationship of the class loaders in accordance with a dependency relationship of the plurality of subsets of the plurality of normalized class groups;
   generating a transformation of the determined hierarchical relationship of the class loaders; and
   generating the hierarchical stack of class loaders in accordance with the generated transformation of the determined hierarchical relationship of the class loaders.

56. The computer-implemented method as recited in claim 51, wherein said generating a hierarchical stack of class loaders comprises:
   determining a hierarchical relationship of the class loaders in accordance with a dependency relationship of the plurality of subsets of the plurality of normalized class groups;
   generating a transitive closure of the determined hierarchical relationship of the class loaders; and
   generating the hierarchical stack of class loaders in accordance with the generated transitive closure of the determined hierarchical relationship of the class loaders.

57. The computer-implemented method as recited in claim 51, wherein said generating a hierarchical stack of class loaders comprises:
   determining a hierarchical relationship of the class loaders in accordance with a dependency relationship of the plurality of subsets of the plurality of normalized class groups;
   generating a transitive reduction of the determined hierarchical relationship of the class loaders; and
   generating the hierarchical stack of class loaders in accordance with the generated transitive reduction of the determined hierarchical relationship of the class loaders.

58. The computer-implemented method as recited in claim 51, wherein each class loader in the hierarchical stack of class loaders has at most one parent class loader in the hierarchical stack of class loaders.

59. The computer-implemented method as recited in claim 51, wherein one or more of the class loaders in the hierarchical stack of class loaders each has two or more parent class loaders in the hierarchical stack of class loaders.

60. The computer-implemented method as recited in claim 51, further comprising:
   each of one or more of the class loaders in the hierarchical stack of class loaders loading one or more classes in its associated subset of the plurality of normalized class groups in the application;
   detecting that one of the one or more loaded classes has been changed; and
   in response to said detecting that one of the one or more loaded classes has been changed, replacing one of the class loaders in the hierarchical stack of class loaders with a new class loader, wherein the replaced class loader is configured to load member classes of a subset of the plurality of normalized class groups comprising a normalized class group that includes the class that has been changed as a member class, and wherein the new class loader is configured to load the member classes of the subset of the plurality of normalized class groups comprising the normalized class group that includes the changed class as a member class.

61. The computer-implemented method as recited in claim 60, further comprising:
   the new class loader loading the member classes of the normalized class group that includes the changed class as a member class in the application;
   wherein said detecting that one of the one or more loaded classes has been changed, said replacing one of the class loaders in the hierarchical stack of class loaders with a new class loader, and said loading the normalized class group that includes the changed class in the application are performed while the application is executing.

62. The computer-implemented method as recited in claim 61, further comprising the hierarchical stack of class loaders loading the changed class and one or more others of the plurality of classes with dependencies on the changed class in the application in response to said detecting that one of the one or more loaded classes has been changed.

63. The computer-implemented method as recited in claim 60, further comprising:
   determining one or more other class loaders configured to load associated subsets of the plurality of normalized class groups comprising normalized class groups that include one or more classes with dependencies on the changed class as member classes; and
   each of the one or more other class loaders loading member classes of an associated subset of the plurality of normalized class groups comprising the normalized class groups that include the one or more classes with dependencies on the changed class as member classes during execution of the application.

64. The computer-implemented method as recited in claim 63, further comprising, prior to the one or more other class loaders loading member classes of associated subsets of the plurality of normalized class groups, replacing the one or more other class loaders in the hierarchical stack of class loaders with new class loaders.

65. The computer-implemented method as recited in claim 51, wherein the application is one of a plurality of applications executing within an application server, the method further comprising performing said generating a plurality of normalized class groups, said determining a directed dependency relationship of the plurality of normalized class groups, said assigning a class loader to each subset of the plurality of normalized class groups, and said generating a hierarchical stack of class loaders for each of the plurality of applications.

66. The computer-implemented method as recited in claim 65, wherein the application server provides a platform-independent, object-oriented application environment.

67. The computer-implemented method as recited in claim 51, wherein one or more of said generating a plurality of normalized class groups, said determining a directed dependency relationship of the plurality of normalized class groups, said assigning a class loader to each subset of the plurality of normalized class groups, and said generating a hierarchical stack of class loaders are performed without user input.

68. The computer-implemented method as recited in claim 51, wherein one or more of said generating a plurality of normalized class groups, said determining a directed dependency relationship of the plurality of normalized class groups, said assigning a class loader to each subset of the plurality of normalized class groups, and said generating a hierarchical stack of class loaders are performed in response to user input.

69. A computer-implemented method for assigning classes to class loaders for an application, the method comprising:

generating a plurality of normalized class groups, wherein each of the plurality of normalized class groups comprises one or more of a plurality of classes used by the application as member classes in the normalized class group, and wherein each class of the plurality of classes is a member class in exactly one of the plurality of normalized class groups;

determining a non-cyclical directed dependency relationship of the plurality of normalized class groups in accordance with relationships of one or more member classes in each of the plurality of normalized class groups with one or more member classes in one or more others of the plurality of normalized class groups;

determining a hierarchical dependency relationship of a plurality of subsets of the plurality of normalized class groups, wherein each subset comprises one or more of the plurality of normalized class groups;

assigning a separate class loader to each of the plurality of subsets of the plurality of normalized class groups, wherein each class loader is configured to load member classes of normalized class groups in its associated subset of the plurality of normalized class groups;

determining a hierarchical relationship of the class loaders assigned to each of the plurality of subsets of the plurality of normalized class groups, wherein the hierarchical relationship of the class loaders is determined in accordance with the hierarchical dependency relationship of the plurality of subsets of the plurality of normalized class groups;

generating a transformation of the hierarchical relationship of the class loaders; and generating a hierarchical stack of class loaders comprising the class loaders assigned to the plurality of subsets of the plurality of normalized class groups, wherein the hierarchical stack of class loaders is generated in accordance with the generated transformation of the hierarchical relationship of the class loaders, wherein the hierarchical stack of class loaders is configured for use in loading changed classes during execution of the application.

70. The computer-implemented method as recited in claim 69, wherein the transformation is a transitive closure of the hierarchical relationship of the class loaders.

71. The computer-implemented method as recited in claim 69, wherein the transformation is a transitive reduction of the hierarchical relationship of the class loaders.

72. The computer-implemented method as recited in claim 69, wherein said generating a plurality of normalized class groups comprises:

identifying one or more non-interdependent classes and at least one set of two or more interdependent classes among the plurality of classes; and grouping the one or more non-interdependent classes and the at least one set of two or more interdependent classes into the plurality of normalized class groups, wherein each normalized class group comprises either one or more of the sets from the at least one set of two or more interdependent classes or one or more of the one or more non-interdependent classes, and wherein each of the plurality of classes is a member class in exactly one of the plurality of normalized class groups.

73. The computer-implemented method as recited in claim 69, further comprising:

for each normalized class group that is dependent on only one other normalized class group, assigning the one other normalized class group to a subset of the normalized class groups comprising at least the one other normalized class group, and wherein, in the hierarchical stack of class loaders, a class loader assigned to the subset of the normalized class groups comprising the one other normalized class group is a of a class loader assigned to the normalized class group that is dependent on the one other normalized class group;

for each normalized class group that is dependent on two or more other normalized class groups, assign the two or more other normalized class groups to a subset of the normalized class groups comprising at least the two or more other normalized class groups, and wherein, in the hierarchical stack of class loaders, a class loader assigned to the subset of the normalized class groups comprising the two or more other normalized class groups is a parent of a class loader assigned to the normalized class group that is dependent on the two or more other normalized class groups.

74. The computer-implemented method as recited in claim 69, wherein the each class loader in the hierarchical stack of class loaders is configured to load member classes of normalized class groups in its associated subset of the plurality of class groups in the application, the method further comprising:

detecting that one of the plurality of classes has been changed while the application is executing; and in response to said detecting that one of the plurality of classes has been changed, replacing a class loader that is configured to load one or more of the plurality of classes including the class that has been changed with a new class loader that is configured to load one or more of the plurality of classes including the changed class in the hierarchical stack of class loaders while the application is executing;

wherein the new class loader is configured to load member classes of normalized class groups in its associated subset of the plurality of normalized class groups while the application is executing.

75. The computer-implemented method as recited in claim 74, further comprising determining one or more other class loaders configured to load associated subsets of the plurality of normalized class groups comprising one or more normalized class groups that include one or more classes with dependencies on the changed class as member classes, wherein each of the one or more other class loaders is configured to load member classes of its associated subset of the plurality of normalized class groups during execution of the application.

76. A tangible, computer-accessible medium comprising program instructions, wherein the program instructions are computer-executable to implement:

detecting that a class used by an application has been changed;

wherein the application is configured to use a plurality of classes including the class that has been changed, wherein the plurality of classes comprises one or more non-interdependent classes and at least one set of two or more interdependent classes;

wherein the application further comprises a hierarchical stack of class loaders each configured to load one or more of the plurality of classes in the application, wherein each class of the plurality of classes is loadable by exactly one of the class loaders, and wherein said hierarchical stack of class loaders comprises:
 a separate class loader for each set of two or more interdependent classes; and
 a separate class loader for each of one or more groups of the non-interdependent classes, wherein each group comprises at least one of the one or more non-interdependent classes;

in response to said detecting that a class used by the application has been changed, replacing one of the class loaders in the hierarchical stack of class loaders that is configured to load one or more of the plurality of classes including the class that has been changed with a new class loader that is configured to load the one or more of the plurality of classes including the changed class; and the new class loader loading the the one or more of the plurality of classes including the changed class in the application during execution of the application.

77. The tangible, computer-accessible medium as recited in claim 76, wherein the program instructions are further executable to implement:
 in response to said detecting that a class used by the application has been changed, replacing one or more other class loaders in the hierarchical stack of class loaders, wherein each of the one or more other class loaders is configured to load a different one or more of the plurality of classes including one or more classes with dependencies on the changed class; and
 each of the one or more other class loaders loading the different one or more of the plurality of classes including the one or more classes with dependencies on the changed class during execution of the application.

78. The tangible, computer-accessible medium as recited in claim 76, wherein the application is one of one or more applications executing within an application server, wherein the application server provides a platform-independent, object-oriented application environment.

79. The tangible, computer-accessible medium as recited in claim 76, wherein the program instructions are further executable to implement generating the hierarchical stack of class loaders, wherein, in said generating the hierarchical stack of class loaders, the program instructions are further executable to implement:
 generating a plurality of normalized class groups of the plurality of classes, wherein each normalized class group comprises one or more of the plurality of classes as member classes in the normalized class group;
 determining a directed dependency relationship of the plurality of normalized class groups in accordance with relationships of one or more member classes in each of the plurality of normalized class groups with one or more member classes in one or more others of the plurality of normalized class groups, wherein the directed dependency relationship of the plurality of normalized class groups is non-cyclical; and
 for a plurality of subsets of the plurality of normalized class groups, assigning a class loader to each subset, wherein each class loader assigned to a subset of the plurality of normalized class groups is configured to load the one or more classes in its associated subset of the plurality of normalized class groups.

80. The tangible, computer-accessible medium as recited in claim 79, wherein, in said generating a plurality of normalized class groups of the plurality of classes, the program instructions are further executable to implement:
 identifying the one or more non-interdependent classes and the at least one set of two or more interdependent classes of the plurality of classes of the application; and
 grouping the one or more non-interdependent classes and the at least one set of two or more interdependent classes into the plurality normalized of class groups, wherein each normalized class group comprises either one or more of the sets from the at least one set of two or more interdependent classes or one or more of the one or more non-interdependent classes, and wherein each class of the plurality of classes is a member in exactly one of the plurality of normalized class groups.

81. The tangible, computer-accessible medium as recited in claim 79, wherein the program instructions are further executable to implement:
 for each normalized class group that is dependent on only one other normalized class group, assigning the one other normalized class group to a subset of the normalized class groups comprising at least the one other normalized class group, and wherein, in the hierarchical stack of class loaders, a class loader assigned to the subset of the normalized class groups comprising the one other normalized class group is a parent of a class loader assigned to the normalized class group that is dependent on the one other normalized class group; and
 for each normalized class group that is dependent on two or more other normalized class groups, assigning the two or more other normalized class groups to a subset of the normalized class groups comprising at least the two or more other class groups, and wherein, in the hierarchical stack of class loaders, a class loader assigned to the subset of the normalized class groups comprising the two or more other normalized class groups is a parent of a class loader assigned to the normalized class group that is dependent on the two or more other normalized class groups.

82. The tangible, computer-accessible medium as recited in claim 79, wherein, in said generating the hierarchical stack of class loaders, the program instructions are further executable to implement:
 determining a hierarchical relationship of the class loaders in accordance with a dependency relationship of the plurality of subsets of the plurality of normalized class groups; and
 generating the hierarchical stack of class loaders in accordance with the determined hierarchical relationship of the class loaders.

83. The tangible, computer-accessible medium as recited in claim 79, wherein, in said generating the hierarchical stack of class loaders, the program instructions are further executable to implement:
 determining a hierarchical relationship of the class loaders in accordance with a dependency relationship of the plurality of subsets of the plurality of normalized class groups;
 generating a transformation of the determined hierarchical relationship of the class loaders; and generating the hierarchical stack of class loaders in accordance with the generated transformation of the determined hierarchical relationship of the class loaders.

84. The tangible, computer-accessible medium as recited in claim 79, wherein, in said generating the hierarchical stack of class loaders, the program instructions are further executable to implement:

determining a hierarchical relationship of the class loaders in accordance with a dependency relationship of the plurality of subsets of the plurality of normalized class groups;

generating a transitive closure of the determined hierarchical relationship of the class loaders; and generating the hierarchical stack of class loaders in accordance with the generated transitive closure of the determined hierarchical relationship of the class loaders.

85. The tangible, computer-accessible medium as recited in claim 79, wherein, in said generating the hierarchical stack of class loaders, the program instructions are further executable to implement:

determining a hierarchical relationship of the class loaders in accordance with a dependency relationship of the plurality of subsets of the plurality of normalized class groups;

generating a transitive reduction of the determined hierarchical relationship of the class loaders; and generating the hierarchical stack of class loaders in accordance with the generated transitive reduction of the determined hierarchical relationship of the class loaders.

86. A tangible, computer-accessible medium comprising program instructions, wherein the program instructions are computer-executable to implement:

for an application configured to use a plurality of classes, generating a plurality of normalized class groups, wherein each of the plurality of normalized class groups comprises one or more of the plurality of classes as member classes in the normalized class group, and wherein each class of the plurality of classes is a member class in exactly one of the plurality of normalized class groups;

determining a directed dependency relationship of the plurality of normalized class groups in accordance with relationships of one or more member classes in each of the plurality of normalized class groups with one or more member classes in one or more others of the plurality of normalized class groups, wherein the directed dependency relationship is non-cyclical;

for a plurality of subsets of the plurality of normalized class groups, assigning a class loader to each subset of the plurality of normalized class groups, wherein each class loader assigned to a subset of the plurality of normalized class groups is configured to load the one or more member classes in its associated subset of the plurality of normalized class groups; and generating a hierarchical stack of class loaders comprising the class loaders assigned to the plurality of subsets of the plurality of normalized class groups, wherein the hierarchical stack of class loaders is configured for use in loading changed member classes of the plurality of normalized class groups during execution of the application.

87. The tangible, computer-accessible medium as recited in claim 86, wherein, in said generating a plurality of normalized class groups, the program instructions are further executable to implement:

identifying one or more non-interdependent classes and at least one set of two or more interdependent classes among the plurality of classes; and grouping the one or more non-interdependent classes and the at least one set of two or more interdependent classes into the plurality of normalized class groups, wherein each normalized class group comprises either one or more of the sets from the at least one set of two or more interdependent classes or one or more of the one or more non-interdependent classes, and wherein each of the plurality of classes is a member in exactly one of the plurality of normalized class groups.

88. The tangible, computer-accessible medium as recited in claim 86, wherein the program instructions are further executable to implement:

for each normalized class group that is dependent on only one other normalized class group, assigning the one other normalized class group to a subset of the normalized class groups comprising at least the one other normalized class group, and wherein, in the hierarchical stack of class loaders, a class loader assigned to the subset of the normalized class groups comprising the one other normalized class group is a parent of a class loader assigned to the normalized class group that is dependent on the one other normalized class group; and for each normalized class group that is dependent on two or more other normalized class groups, assigning the two or more other normalized class groups to a subset of the normalized class groups comprising at least the two or more other normalized class groups, and wherein, in the hierarchical stack of class loaders, a class loader assigned to the subset of the normalized class groups comprising the two or more other normalized class groups is a parent of a class loader assigned to the normalized class group that is dependent on the two or more other normalized class groups.

89. The tangible, computer-accessible medium as recited in claim 86, wherein, in said generating a hierarchical stack of class loaders, the program instructions are further executable to implement:

determining a hierarchical relationship of the class loaders in accordance with a dependency relationship of the plurality of subsets of the plurality of normalized class groups; and generating the hierarchical stack of class loaders in accordance with the determined hierarchical relationship of the class loaders.

90. The tangible, computer-accessible medium as recited in claim 86, wherein, in said generating a hierarchical stack of class loaders, the program instructions are further executable to implement:

determining a hierarchical relationship of the class loaders in accordance with a dependency relationship of the plurality of subsets of the plurality of normalized class groups;

generating a transformation of the determined hierarchical relationship of the class loaders; and generating the hierarchical stack of class loaders in accordance with the generated transformation of the determined hierarchical relationship of the class loaders.

91. The tangible, computer-accessible medium as recited in claim 86, wherein, in said generating a hierarchical stack of class loaders, the program instructions are further executable to implement:

determining a hierarchical relationship of the class loaders in accordance with a dependency relationship of the plurality of subsets of the plurality of normalized class groups;

generating a transitive closure of the determined hierarchical relationship of the class loaders; and generating the hierarchical stack of class loaders in accordance with the generated transitive closure of the determined hierarchical relationship of the class loaders.

92. The tangible, computer-accessible medium as recited in claim 86, wherein, in said generating a hierarchical stack of class loaders, the program instructions are further executable to implement:

determining a hierarchical relationship of the class loaders in accordance with a dependency relationship of the plurality of subsets of the plurality of normalized class groups;

generating a transitive reduction of the determined hierarchical relationship of the class loaders; and generating the hierarchical stack of class loaders in accordance with the generated transitive reduction of the determined hierarchical relationship of the class loaders.

93. The tangible, computer-accessible medium as recited in claim 86, wherein the program instructions are further executable to implement:

each of one or more of the class loaders in the hierarchical stack of class loaders loading one or more classes in its associated subset of the plurality of normalized class groups in the application;

detecting that one of the one or more loaded classes has been changed; and in response to said detecting that one of the one or more loaded classes has been changed, replacing one of the class loaders in the hierarchical stack of class loaders with a new class loader, wherein the replaced class loader is configured to load member classes of a subset of the plurality of normalized class groups comprising a normalized class group that includes the class that has been changed as a member class, and wherein the new class loader is configured to load the member classes of the subset of the plurality of normalized class groups comprising the normalized class group that includes the changed class as a member class.

94. The tangible, computer-accessible medium as recited in claim 93, wherein the program instructions are further executable to implement:

the new class loader loading the member classes of the normalized class group that includes the changed class as a member class in the application;

wherein said detecting that one of the one or more loaded classes has been changed, said replacing one of the class loaders in the hierarchical stack of class loaders with a new class loader, and said loading the normalized class group that includes the changed class in the application are performed while the application is executing.

95. The tangible, computer-accessible medium as recited in claim 93, wherein the program instructions are further executable to implement:

determining one or more other class loaders configured to load associated subsets of the plurality of normalized class groups comprising normalized class groups that include one or more classes with dependencies on the changed class as member classes; and each of the one or more other class loaders loading member classes of an associated subset of the plurality of normalized class groups comprising the normalized class groups that include the one or more classes with dependencies on the changed class as member classes during execution of the application.

96. The tangible, computer-accessible medium as recited in claim 95, wherein the program instructions are further executable to implement, prior to the one or more other class loaders loading member classes of associated subsets of the plurality of normalized class groups, replacing the one or more other class loaders in the hierarchical stack of class loaders with new class loaders.

97. A tangible, computer-accessible medium comprising program instructions, wherein the program instructions are computer-executable to implement:

for an application configured to use a plurality of classes, generating a plurality of normalized class groups, wherein each of the plurality of normalized class groups comprises one or more of the plurality of classes as member classes in the normalized class group, and wherein each class of the plurality of classes is a member class in exactly one of the plurality of normalized class groups;

determining a non-cyclical directed dependency relationship of the plurality of normalized class groups in accordance with relationships of one or more member classes in each of the plurality of normalized class groups with one or more member classes in one or more others of the plurality of normalized class groups;

determining a hierarchical dependency relationship of a plurality of subsets of the plurality of normalized class groups, wherein each subset comprises one or more of the plurality of normalized class groups;

assigning a separate class loader to each of the plurality of subsets of the plurality of normalized class groups, wherein each class loader is configured to load member classes of normalized class groups in its associated subset of the plurality of normalized class groups;

determining a hierarchical relationship of the class loaders assigned to each of the plurality of subsets of the plurality of normalized class groups, wherein the hierarchical relationship of the class loaders is determined in accordance with the hierarchical dependency relationship of the plurality of subsets of the plurality of normalized class groups;

generating a transformation of the hierarchical relationship of the class loaders; and generating a hierarchical stack of class loaders comprising the class loaders assigned to the plurality of subsets of the plurality of normalized class groups, wherein the hierarchical stack of class loaders is generated in accordance with the generated transformation of the hierarchical relationship of the class loaders, wherein the hierarchical stack of class loaders is configured for use in loading changed classes during execution of the application.

98. The tangible, computer-accessible medium as recited in claim 97, wherein the transformation is a transitive closure of the hierarchical relationship of the class loaders.

99. The tangible, computer-accessible medium as recited in claim 97, wherein the transformation is a transitive reduction of the hierarchical relationship of the class loaders.

100. The tangible, computer-accessible medium as recited in claim 97, wherein, in said generating a plurality of normalized class groups, the program instructions are further executable to implement:

identifying one or more non-interdependent classes and at least one set of two or more interdependent classes among the plurality of classes; and grouping the one or more non-interdependent classes and the at least one set of two or more interdependent classes into the plurality of normalized class groups, wherein each normalized class group comprises either one or more of the sets from the at least one set of two or more interdependent classes or one or more of the one or more non-interdependent classes, and wherein each of the plurality of classes is a member class in exactly one of the plurality of normalized class groups.

101. The tangible, computer-accessible medium as recited in claim 97, wherein the program instructions are further executable to implement:

for each normalized class group that is dependent on only one other normalized class group, assigning the one other normalized class group to a subset of the normalized class groups comprising at least the one other normalized class group, and wherein, in the hierarchical stack of class loaders, a class loader assigned to the subset of the normalized class groups comprising the one other normalized class group is a of a class loader assigned to the normalized class group that is dependent on the one other normalized class group;

for each normalized class group that is dependent on two or more other normalized class groups, assign the two or more other normalized class groups to a subset of the normalized class groups comprising at least the two or more other normalized class groups, and wherein, in the hierarchical stack of class loaders, a class loader assigned to the subset of the normalized class groups comprising the two or more other normalized class groups is a parent of a class loader assigned to the normalized class group that is dependent on the two or more other normalized class groups.

102. The tangible, computer-accessible medium as recited in claim 97, wherein the each class loader in the hierarchical stack of class loaders is configured to load member classes of normalized class groups in its associated subset of the plurality of class groups in the application, and wherein the program instructions are further executable to implement:

detecting that one of the plurality of classes has been changed while the application is executing; and in response to said detecting that one of the plurality of classes has been changed, replacing a class loader that is configured to load one or more of the plurality of classes including the class that has been changed with a new class loader that is configured to load one or more of the plurality of classes including the changed class in the hierarchical stack of class loaders while the application is executing;

wherein the new class loader is configured to load member classes of normalized class groups in its associated subset of the plurality of normalized class groups while the application is executing.

103. The tangible, computer-accessible medium as recited in claim 102, wherein the program instructions are further executable to implement determining one or more other class loaders configured to load associated subsets of the plurality of normalized class groups comprising one or more normalized class groups that include one or more classes with dependencies on the changed class as member classes, wherein each of the one or more other class loaders is configured to load member classes of its associated subset of the plurality of normalized class groups during execution of the application.

* * * * *